(12) United States Patent
Shem-Tov

(10) Patent No.: US 12,413,507 B2
(45) Date of Patent: *Sep. 9, 2025

(54) SATISFYING DEMANDS IN DATA COMMUNICATIONS NETWORKS

(71) Applicant: ECI Telecom Ltd., Petah Tikva (IL)

(72) Inventor: Ziv Shem-Tov, Ramat Hasharon (IL)

(73) Assignee: ECI Telecom Ltd., Petah Tikva (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/175,260

(22) Filed: Feb. 27, 2023

(65) Prior Publication Data

US 2023/0370359 A1 Nov. 16, 2023

Related U.S. Application Data

(63) Continuation of application No. 17/685,874, filed on Mar. 3, 2022, now Pat. No. 11,595,294.

(51) Int. Cl.
*H04L 45/02* (2022.01)
*G06F 16/901* (2019.01)
*H04L 41/0826* (2022.01)
*H04L 45/00* (2022.01)

(52) U.S. Cl.
CPC .......... *H04L 45/02* (2013.01); *G06F 16/9024* (2019.01); *H04L 41/0826* (2013.01); *H04L 45/22* (2013.01)

(58) Field of Classification Search
None
See application file for complete search history.

(56) References Cited

U.S. PATENT DOCUMENTS

| 5,533,016 A | 7/1996 | Cook et al. |
| 6,463,033 B1* | 10/2002 | Harshavardhana ..... H04L 45/28 370/408 |
| 6,819,662 B1 | 11/2004 | Grover et al. |
| 10,841,003 B1 | 11/2020 | Ezra et al. |
| 10,893,111 B1 | 1/2021 | Ezra et al. |
| 11,354,771 B1* | 6/2022 | Dann ........................ G06T 1/60 |
| 11,595,294 B1* | 2/2023 | Shem-Tov .......... G06F 16/9024 |
| 2003/0009598 A1* | 1/2003 | Gunluk ................... H04L 45/02 709/251 |

(Continued)

OTHER PUBLICATIONS

European Patent Office Communication Regarding Extended European Search Report in counterpart European Patent Application No. 23158905.2 mailed Jul. 18, 2023, 12 pages.

*Primary Examiner* — Xavier S Wong
(74) *Attorney, Agent, or Firm* — Finnegan, Henderson, Farabow, Garrett & Dunner LLP

(57) ABSTRACT

Systems and methods are disclosed for identifying a set of internal edges on a representation of a network that satisfy a set of demands on the network. The disclosed systems and methods perform a multi-step process of selecting the internal edges. In a first step, an initial set of internal edges can be selected using a clique graph (or in another suitable manner). In a second step, a second set of internal edges can be selected using stream graph(s) (or in another suitable manner). The second set of internal edges can be used when determining network paths that satisfy the demands. When the representation of the network has a cut of two, the disclosed systems and methods can identify a set of internal edges providing a degree of protection against link failure.

18 Claims, 28 Drawing Sheets

(56) References Cited

U.S. PATENT DOCUMENTS

| | | | |
|---|---|---|---|
| 2008/0218518 A1* | 9/2008 | Zhou | G06F 17/11 |
| | | | 345/440 |
| 2009/0296710 A1* | 12/2009 | Agrawal | H04L 45/04 |
| | | | 370/392 |
| 2013/0339290 A1 | 12/2013 | Lee et al. | |
| 2015/0205707 A1* | 7/2015 | Dwarakanath | G06F 11/3608 |
| | | | 717/124 |
| 2016/0055660 A1 | 2/2016 | Yamane | |
| 2018/0241636 A1* | 8/2018 | Zhang | H04L 45/24 |

* cited by examiner

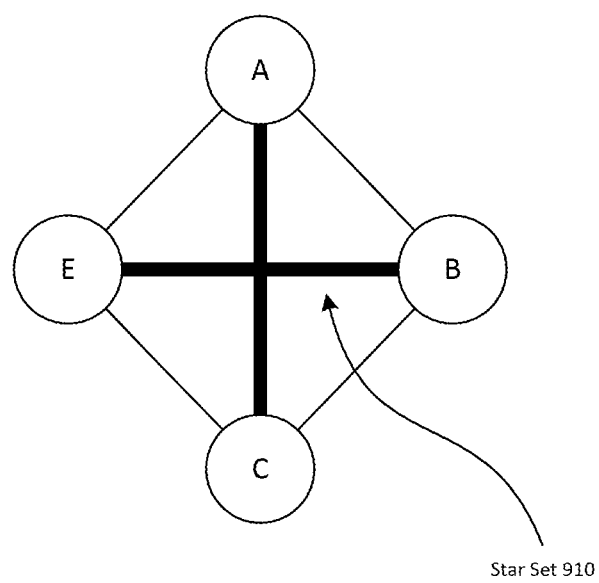
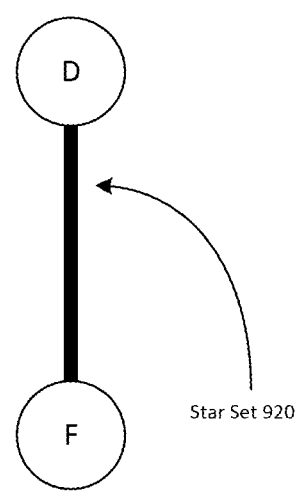
Star Set 910
Star Set 920
FIG. 9A
FIG. 9B $D_1 = <a, f, 1++>$

1010

1020

1110

$D_2 = <b, c, 1++>$

1120

$D_4 = \langle a, c, 1++\rangle$

SATISFYING DEMANDS IN DATA COMMUNICATIONS NETWORKS

This application is a continuation of U.S. application Ser. No. 17/685,874, filed on Mar. 3, 2022, the entirety of which is incorporated herein by reference.

TECHNICAL FIELD

The present disclosure relates to the field of data communication networks and, more particularly, to systems and methods for satisfying demands in a data communication network.

BACKGROUND

A data communication network may support different types of demands having different levels of link failure protection. Paths in the data communication network should be selected such that link failure protection requirement are satisfied. When a link failure occurs, a network path must be identified that satisfies the demand and does not go through the failed link. The number of links required to satisfy a demand on a network should be reduced to increase the capacity of the network and reduce the cost of operating the network.

SUMMARY

A multi-step process can be used to reduce the number of internal edges required to satisfy a set of demands on a network. In some embodiments, a clique graph can be used to identify an initial subset of internal edges. In various embodiments, a stream graph can be used to further refine an initial subset of internal edges (e.g., generated using a clique graph or in another suitable manner). Alternatively, the initial subset of internal edges can be refined using a Steiner graph (or in another suitable manner).

The disclosed embodiments include a non-transitory computer-readable medium containing first instructions that, when executed by at least one processor of a system, cause the system to perform operations. The operations can include selecting a cycle of a network and identifying demands for the network that originate and terminate on the cycle. The operations can further include generating a representation of the network and the demands. The representation can include vertices corresponding to nodes of the network on the cycle, external edges corresponding to communication links of the network on the cycle, and internal edges. The external edges can connect the vertices. Each internal edge can connect two of the vertices. The representation can further include a set of flows corresponding to the identified demands, each flow having a source vertex and a target vertex. The operations can further include identifying a subset of the internal edges based on the set of flows. The operations can further include determining, using a stream graph generated based on a one of the set of flows and the identified subset of the internal edges, a set of graph paths that satisfy the one of the flows. The operations can further include providing second instructions for configuring the network to satisfy a one of the demands that corresponds to the one of the set of flows, the second instructions indicating a set of network paths that corresponds to the set of graph paths.

The disclosed embodiments include a non-transitory, computer-readable medium containing first instructions that, when executed by at least one processor of a system, cause the system to perform operations. The operations can include obtaining a first representation of a cycle of a network and a first demand on the network. The first representation can include vertices corresponding to nodes of the network on the cycle, external edges corresponding to communication links of the network on the cycle, the external edges connecting the vertices, first internal edges, each first internal edge connecting two of the vertices, and a first flow corresponding to the first demand on the network. The operations can further include identifying a subset of the first internal edges using a graph corresponding to the first flow, the graph including graph arcs corresponding to the external edges and graph edges corresponding to the first internal edges. The operations can further include determining a set of graph paths that satisfy the first flow using the identified subset of the first internal edges. The operations can further include providing second instructions for configuring the network to satisfy the first demand, the second instructions indicating a set of network paths that corresponds to the set of graph paths.

The disclosed embodiments include a non-transitory, computer-readable medium containing first instructions that, when executed by at least one processor of a system, cause the system to perform operations. The operations can include obtaining a first representation of a cycle of a network and demands on the network. The first representation can include vertices corresponding to nodes of the network on the cycle, external edges corresponding to communication links of the network on the cycle, the external edges connecting the vertices, first internal edges, each first internal edge connecting two of the vertices, and flows corresponding to the demands. The operations can further include identifying a subset of the first internal edges based on the flows. Such identification can include building a clique graph using the flows; identifying sub-cliques on a tree of the clique graph; and converting the identified sub-cliques into the identified subset of the first internal edges. The operations can further include determining a set of graph paths that satisfy a one of the flows using the identified subset of the first internal edges. The operations can further include providing second instructions for configuring the network to satisfy a one of the demands that corresponds to the one of the flows, the second instructions indicating a set of network paths that corresponds to the set of graph paths.

The disclosed embodiments include a non-transitory, computer-readable medium containing first instructions that, when executed by at least one processor of a system, cause the system to perform operations. The operations can include obtaining a representation of a network and demands on the network. The representation can include vertices corresponding to nodes of the network, external edges corresponding to communication links, the external edges connecting the vertices into a simple cycle, pairwise disjoint internal edges, each internal edge connecting two of the vertices, the pairwise disjoint internal edges collected into cliques $N_1, N_2, \ldots, N_k$, where $N_i$ only crosses cliques $N_{i+1}$ and $N_{i-1}$, and flows corresponding to the demands, the flows being of protection type 1++. The flows can include, for every $i \in \{1, \ldots, k\}$ a first flow set and a second flow set. The first flow set can specify a first flow for each combination of a first vertex endpoint in $N_i$ and another vertex in $N_{i+1}$. The second flow set can specify a second flow for each a last vertex endpoint in $N_i$ and another vertex endpoint in $N_{i-1}$. The operations can further include determining, for each flow, three edge-disjoint graph paths that satisfy the flow, the three edge-disjoint graph paths collectively including exactly two internal edges. The operations can further include providing second instructions for configuring the network to satisfy the demands using network paths that correspond to the graph paths determined for the flows.

The foregoing general description and the following detailed description are exemplary and explanatory only, and are not restrictive of the claims.

BRIEF DESCRIPTION OF THE DRAWINGS

The accompanying drawings, which are incorporated in and constitute part of this disclosure, together with the description, illustrate and serve to explain the principles of various example embodiments.

FIGS. 9A and 9B depicts star sets internal edges generated using the clique graph of FIG. 7B, consistent with disclosed embodiments.

FIG. 14A depicts the exemplary communication network. FIG. 14B depicts a connection graph for the network of FIG. 14A. FIG. 14C depicts identification of sub-demands corresponding to the original demand on the network of FIG. 14A. FIG. 14D depicts a clique graph corresponding to the sub-demands on the network of FIG. 14A. FIGS. 14E to 14I depict paths found on the stream graphs for each of the sub-demands on the network of FIG. 14A. FIG. 14J depicts the internal edges corresponding to the paths depicted in FIGS. 14E to 14I and a graph path for the flow corresponding to the original demand.

DETAILED DESCRIPTION

Figure 1:
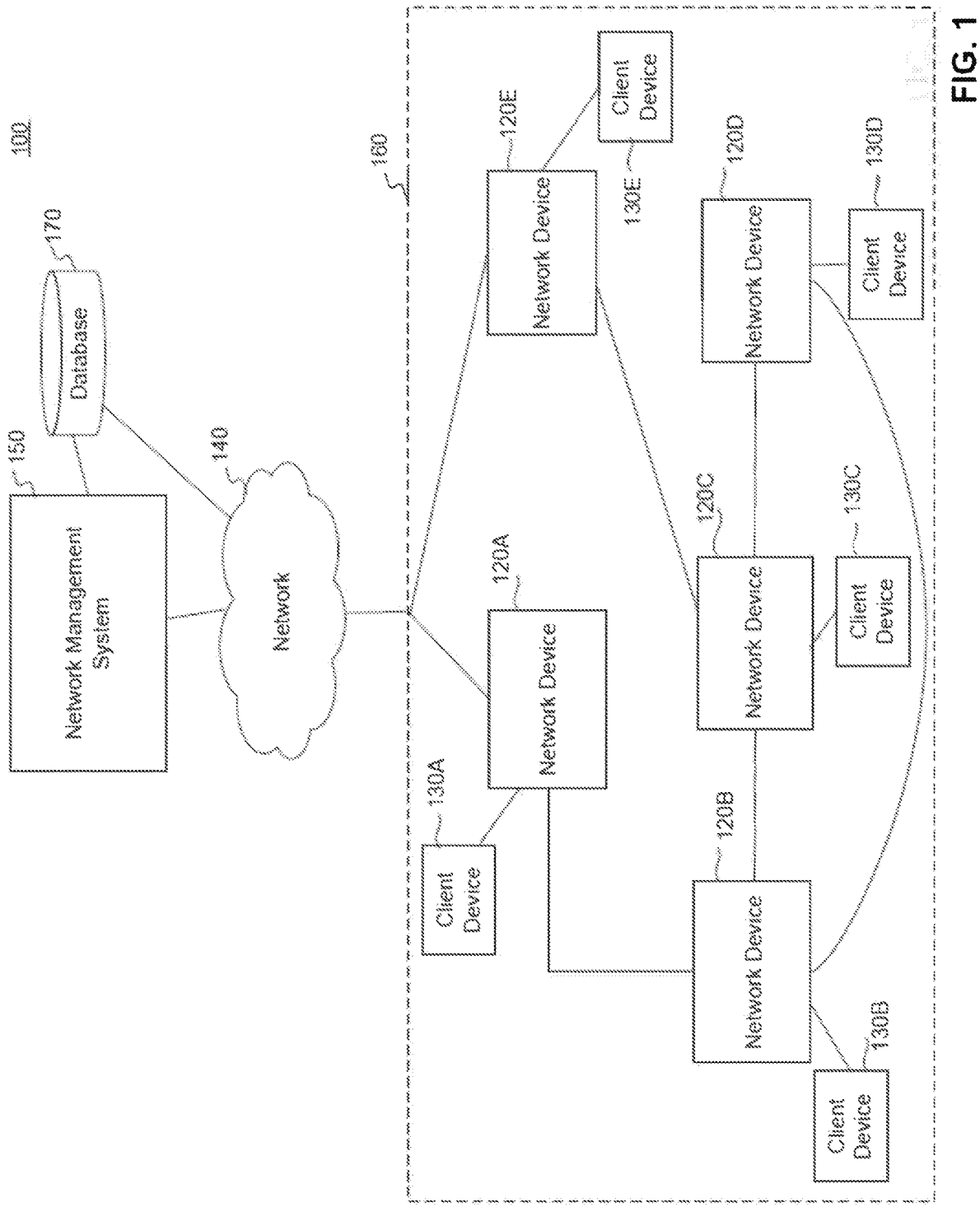
FIG. 1 depicts an exemplary data communication network in which various implementations as described herein may be practiced.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

A communication network can include network nodes (e.g., clients, servers, microservices, virtual machines, serverless code instances, IoT devices, etc.) configured to communicate with one another using the communication links. The disclosed embodiments are not limited to any particular communication link implementation or physical medium. The communication links can include wired or wireless communication links. Wired communication links can include optical links, electrical communication links, or other suitable links. Wireless communication links can include microwave, radio wave, optical links, or other suitable wireless links. Communications between network nodes can be implemented using communications protocols. The disclosed embodiments are not limited to any particular communication protocol. Communication protocols can include cellular communication protocols (e.g., 3G, 4G, 5G, or the like), IEEE 802 or IEEE 802-based protocols (e.g., Ethernet, WiFi, Zigbee or the like), Digital subscriber line (DSL), Plain old telephone service (POTS), or other suitable protocols.

A communication network can be configured to satisfy demands. As used herein, a demand can be a request to communicate (or establish a communication channel, or the like) between a source node and a target node in the network. In some embodiments, a demand can specify a source node and a target node. In various embodiments, one or more of the source node and target node can be implicit or determined by the communication network in response to the demand. Satisfaction of a demand may require identification of a network path connecting the source node and the target node.

A graph can represent the communication network, or a subset of the communication network. The graph can be defined as follows:

$$G=(V,E)$$

Where G is the graph, V are the vertices of the graph, and E are the edges of the graph. Nodes in the communication network can correspond to vertices in the graph. As described herein, each edge in the graph can correspond to one or more communication links and zero or more nodes. The graph can include a number of vertices connected by external edges into a cycle.

$$C=(V_c, E_c), V_c=(v_0, \ldots, v_{n-1}, v_0)$$

where $v_i \neq v_j$ for every $0 \leq i,j < n$ and $E_C = \{\{v_i, v_{i+1}\}: \forall 0 \leq i < n\}$ In some instances, in addition to edges on the cycle, pairs of vertices in the cycle can be connected by edges that are not on the cycle (e.g., internal edges). Internal paths $p_1=\{v_i, v_j\}$ $p_2=\{v_x, v_y\}$ are crossing internal paths (denoted $p_1 \times p_2$) when i≤x≤j≤y or x≤i≤y≤j. Two sets of internal paths $S_1$ and $S_2$ on C are crossing sets of internal paths (denoted $S_1 \times S_2$) when $\exists p_i \in S_1$ and $\exists p_j \in S_2$ such that $p_i \times p_j$. A set of internal paths N of C, the endpoints of the internal paths of N forming a set of endpoints $V_N$, is a clique when $\forall u, w \in V_N$ there exists a p={u, w} such that p ∈ N.

Demands on the communication network can correspond to flows on the graph. A subset of the flows can be on cycle C:

$$\forall f \in F, f = <s_f, t_f>, s_f \in V_C \wedge t_f \in V_C$$

Thus every flow f can have a source and a target vertex on cycle C. Given a graph representing a communication network, the problem of configuring the network to satisfy a demand between a source node and a target node can be framed as a problem of identifying paths in the graph (e.g., a graph paths) that connect a source vertex corresponding to the source node with a target vertex corresponding to the target node. In some instances, this problem can further include finding graph paths that include a minimum number of edges, or that include a reduced number of edges as compared to conventional approaches.

In some embodiments, a demand can include a protection type. A protection type can specify identification of a number of particular alternative network paths, or can specify conditions that in turn imply the existence of the number of alternative network paths. Exemplary protection types include 1+R+R protection, 1+1+R protection, and 1++ protection. For convenience, the protection types are described herein in terms of graph paths on a graph representing a network, but the disclosed embodiments are not limited to these protection types, or protection types specified in such a manner.

The 1+R+R protection type requires identification of a main graph path from a source vertex to a target vertex, and the existence of two recovery paths that satisfy the demand. A first recovery path exists for any single edge failure in the main path. A second recovery path exists for any single edge failure in the main graph path and any single edge failure in the first recovery path.

The 1+1+R protection type requires identification of two main graph paths from a source vertex to a target vertex, and the existence of one recovery graph path that satisfy the demand. The recovery graph path exists for any single edge failure in the first main graph path and any single edge failure in the second main graph path.

For both 1+R+R and 1+1+R protection type, main graph path(s) and the recovery path(s) may both be determined during a planning phase. In such a planning phase, a set of internal edges sufficient to support the main graph path(s) and recovery path(s) can be determined. The main graph path(s) can be determined using this set of internal edges. After determination of the main graph path(s), the failure of edges on a main graph path (or a recovery path) can be simulated. An indication of functional edges can be obtained in the simulation. The indication can expressly or implicitly indicate the functional edges. For example, the indication can specify the functional edges or can specify the failed edges (thus implicitly specifying the functional edges). Consistent with disclosed embodiments, a recovery path can be determined using functional external edges and functional internal edges in the determined set of internal edges.

For both 1+R+R and 1+1+R protection type, main graph path(s) may be determined during the planning phase and the recovery path(s) determined during an operational phase (e.g., after the network has been configured to implement network path(s) corresponding to the determined main graph path(s)). An indication of functional edges can be obtained during the operational phase (e.g., from the network). As described herein, the indication can expressly or implicitly indicate the functional edges. Consistent with disclosed embodiments, a recovery path can be determined using functional external edges and functional internal edges in the determined set of internal edges.

The 1++ protection type requires identification of two fully disjoint main paths and the existence of a third fully disjoint recovery path. Each of these graph paths may be identified during a planning phase. Alternatively, internal edges sufficient to support the third graph path can be identified. The third graph path can then be identified during an operational phase in response to detection of a failure in one of the main paths. As with the 1+R+R and 1+1+R protection types, an indication of functional edges can be obtained and the recovery path determined using functional external edges and functional internal edges in the identified set of internal edges.

In some instances, a network cannot support 1+1+R or 1++ protection for a demand. For example, a failure of a "disconnecting" pair of edges may be sufficient to partition the network into two disjoint sub-networks, the first sub-network including a source node of a demand and the second sub-network including the target node of the demand. As may be appreciated, a failure of a disconnecting pair of edges cannot be protected against.

However, the disclosed embodiments can still provide a measure of protection for such demands (e.g., referred to herein as "type 2" protection). Type 2 protection provides a graph path and the existence of two alternate graph paths that satisfy the demand. At least one alternative paths exists for any two external edge failures that do not form a disconnecting pair. Thus existence of an alternative path is guaranteed, so long as the pair of external edges that fail do not disconnect the source and target node. The network management device can receive a demand having a 1+1+R or 1++ protection type and provide type 2 protection for that demand, based on the topology of the network. In some embodiments, the network management device can provide an indication (e.g., to a user of the network management device, to another system, to a log file, or the like) of the provision of type 2 protection (e.g., rather than the requested 1+1+R, 1+R+R, or 1++ protection).

Typical real-world communications networks can include hundreds of nodes connected by thousands of links. Such networks may need to satisfy thousands of demands. The size and complexity of such networks may render unfeasible conventional approaches to identifying network paths that satisfy these demands. The disclosed systems and methods address this technical problem by identifying, within an overall set of edges in a graph representing a communications network, a subset of edges sufficient to satisfy a set of demands. This identified subset typically includes only a fraction of the edges in the overall graph. For each demand in the set of demands, a graph path can be found over the identified subset of edges and the communications network configured to implement a corresponding network path.

The disclosed embodiments have been validated on real-world communications networks. A first trial involved an optical network having 1,326 nodes, 2,090 communications links, and 652 demands. A conventional solution required 7,281 links to satisfy the demands (a link can contribute to network paths for multiple demands and therefore can be counted multiple times), and used both C and L optical bands. In contrast, a solution identified in a manner consistent with disclosed embodiments required only 2,044 links and used only the C optical band (thus freeing up the L band for additional demands). Furthermore, the solution was identified within 15 minutes. A second trial involved a network having 155 nodes, 295 communications links, and 598 demands. A conventional solution required 45 minutes to compute and used 1,270 links to satisfy the demands. A solution identified in a manner consistent with disclosed embodiments required 40 seconds to compute and used 1,200 links to satisfy the demands. A third trial involved a network having 181 nodes, 200 communications links, and 123 demands. A conventional solution required 5 minutes to compute and used approximately 470 links to satisfy the demands. A solution identified in a manner consistent with disclosed embodiments required 2 minutes to compute and used approximate 400 links to satisfy the demands. A fourth trial involved a network having 273 nodes, 776 links, and 11,371 demands. Existing approaches cannot practicably determine links to satisfy the demands for such large networks. A solution identified in a manner consistent with disclosed embodiments required one hour to compute and used approximate 1,600 links to satisfy the demands.

FIG. 1 depicts an exemplary communication network 100 in which various implementations as described herein may be practiced. Communication network 100 includes, for example, a network 140, network management system 150, database 170, nodes 120A-120E, and client devices 130A-130E. Nodes 120A-120E and client devices 130A-130E form a service network 160, in which the nodes 120A-120E (collectively nodes 120) provide data services to client devices 130A-130E (collectively 130). The nodes can include hardware-based or software-based switches, routers, splitters, or the like that facilitate delivery of data services to client devices 130. The components and arrangements shown in FIG. 1 are not intended to limit the disclosed embodiments, as the system components used to implement the disclosed processes and features can vary. For example, each of nodes 120 may be associated with no, one, or many client devices 130. In various embodiments, service network 160 may be based on one or more of on-premises network environments, virtualized (cloud) network environments, or combinations of on-premises and cloud networks. Consistent with embodiments described herein, various types of data may be communicated over service network 160, such as Internet (e.g., IP protocol) data, telephony or telecommunications data, satellite data, IoT-based data, cellular data, proprietary network data, and more.

Network management system 150 can be a computer-based system including computer system components, desktop computers, workstations, tablets, handheld computing devices, memory devices, and/or internal network(s) connecting the components. Network management system 150 can be configured to manage service deliveries for the service network 160. For example, the network management system 150 may determine network paths and allocate resources for demands in the communication network 100. The network management system 150 may determine a set of network paths that satisfy a plurality of demands on communication network 100. In some embodiments, the network management system 150 may identify a set of alternative network paths for a demand in the communication network 100, such that the alternative network paths can be used to satisfy the demand when a network link failure occurs.

Network 140 can facilitate communication between the network management system 150 and the service network 160. Network management system 150 may send data to nodes 120 via network 140 to allocate resources for demands in the communication network 100. Network management system 150 may also receive data from nodes 120 via network 140 indicating the status of communication links in the communication network 100. Network 140 may be an electronic network. Nodes 120 may be configured to receive data over network 140 and process/analyze queries and data. Examples of network 140 include a local area network (LAN), a wireless LAN (e.g., a "WiFi" or mesh network), a Metropolitan Area Network (MAN) that connects multiple LANs, a wide area network (WAN) (e.g., the Internet), a dial-up connection (e.g., using a V.90 protocol or a V.92 protocol), a satellite-based network, a cellular-based network, etc. In the embodiments described herein, the Internet may include any publicly-accessible network or networks interconnected via one or more communication protocols, including, but not limited to, hypertext transfer protocol (HTTP/s) and transmission control protocol/internet protocol (TCP/IP). Moreover, the electronic network may also include one or more mobile device networks, such as a Long Term Evolution (LTE) network or a Personal Communication Service (PCS) network, that allow mobile devices (e.g., client devices 130) to send and receive data via applicable communication protocols, including those described above.

In the illustrated example, nodes 120A and 120E are directly connected to network 140, and nodes 120B-120D connect to the network 140 via their connection to nodes 120A and/or 120E. Nodes 120B-120D may also directly connect to the network 140, or may indirectly connect to the network 140 through numerous other devices. Nodes 120 may be connected to one another via copper wire, coaxial cable, optical fiber, microwave links, or other satellite or radio communication components. Accordingly, nodes 120 may each have a corresponding communications interface (e.g., wireless transceiver, wired transceiver, adapter, etc.) to allow for such communications.

As shown in FIG. 1, nodes 120A-120E are connected to one another. In this example, node 120A is connected to node 120B, node 120B is connected to node 120A, 120C, and 120D, node 120C is connected to node 120B, 120D, and 120E, node 120D is connected to nodes 120B and 120C, and node 120E is connected to node 120C. In some embodiments, the network management system 150 may obtain the connectivity status between the network devices and generate a representation (e.g., a graph) of the connectivity of the network. In various embodiments, the network management system 150 can acquire the network topology from a server or a database associated with a service provider providing the service network 160. As may be appreciated, the service network 160 illustrated in FIG. 1 is not intended to be limiting. The disclosed embodiments include other service network configurations and topologies.

Network management system 150 can be implemented using one or more computing device (e.g., a node of node 120, a mobile device, laptop, desktop, workstation, server, computing cluster or cloud computing platform, or the like). Network management system 150 can be implemented as a distributed system over multiple computing devices. The disclosed embodiments are not limited to any particular implementation of network management system 150.

Database 170 can include one or more physical or virtual storages coupled with the network management system 150. Database 170 may be configured to store information associated with the service network 160, such as a network topology, the capabilities of the nodes 120, the demands and corresponding configurations provided by the service network 160, and so on. Database 170 may also be adapted to store processed information associated with the network topology and demands in the service network 160, so as to facilitate efficient route configurations and resource allocations to satisfy the demands in the service network 160. The data stored in the database 170 may be transmitted to the network management system 150 and/or the nodes 120. In some embodiments, the database 170 is stored in a cloud-based server (not shown) that is accessible by the network management system 150 and/or the nodes 120 through the network 140. While the database 170 is illustrated as an external device connected to the network management system 150, the database 170 may also reside within the network management system 150 as an internal component of the network management system 150.

As shown in FIG. 1, nodes 120A-120E are connected with client devices 130A-130E respectively to service demands. As an example, client devices 130A-130E may include a display such as a television, tablet, computer monitor, video conferencing console, IoT device, or laptop computer screen. Client devices 130A-130E may also include video/audio input devices such as a video camera, web camera, or the like. As another example, client devices 130A-130E may include mobile devices such as a tablet or a smartphone having display and video/audio capture capabilities. While FIG. 1 shows one client device 130 connected to each of nodes 120, zero or more client devices 130 may be connected to a node.

In some embodiments, communication network 100 can include an optical network, where the nodes 120 are interconnected by optical fiber links. Such optical fiber links can include optical fiber links that support communication over multiple optical channels using multiple optical wavelengths. The optical network can be implemented, as least in part, using a wavelength division multiplexing (WDM) physical layer. A WDM optical signal can use a plurality of transmission channels, each channel carrying an information signal modulated over a carrier wavelength. A node can be configurable to switch a channel from an input fiber to an output fiber, or to add/drop traffic. A node can include a wavelength switch or an optical add/drop multiplexer that performs optical add, drop, and pass through. A node may include optical or optical/electrical elements configurable to perform functions including compensating, amplifying, switching, restoring, performing wavelength conversion of incoming optical signals, etc. The optical fiber links may include dispersion compensation fibers (DCF), optical filters, amplifiers, and other relevant optical components suitable for operation of optical networks. The network management system 150 or database 170 can store topologic data that includes information about optical channels and their associated wavelengths. In some embodiments, network management system 150, or another component of communication network 100, can be configured to determine routing and wavelength assignment for a given set of demands. The network management system 150, can create a channel to satisfy a demand. In some embodiments, such a channel can be characterized by a network path and an assigned wavelength number.

In some embodiments, network management system 150 can be configured to detect failures of links in communication network 100. The disclosed embodiments are not limited to any particular method or architecture for detected the failure of links in communication network 100. The network management system 150 can be configured to identify a link failure by detecting degradation in services provided by the data communication network (e.g., services that route traffic through the affected link). Additionally or alternatively, the network management system 150 can identify the link failures using feedback received from nodes. In some embodiments, such nodes can provide indications of communication interruptions (e.g., a failure to send or receive information over a link).

Figure 2:
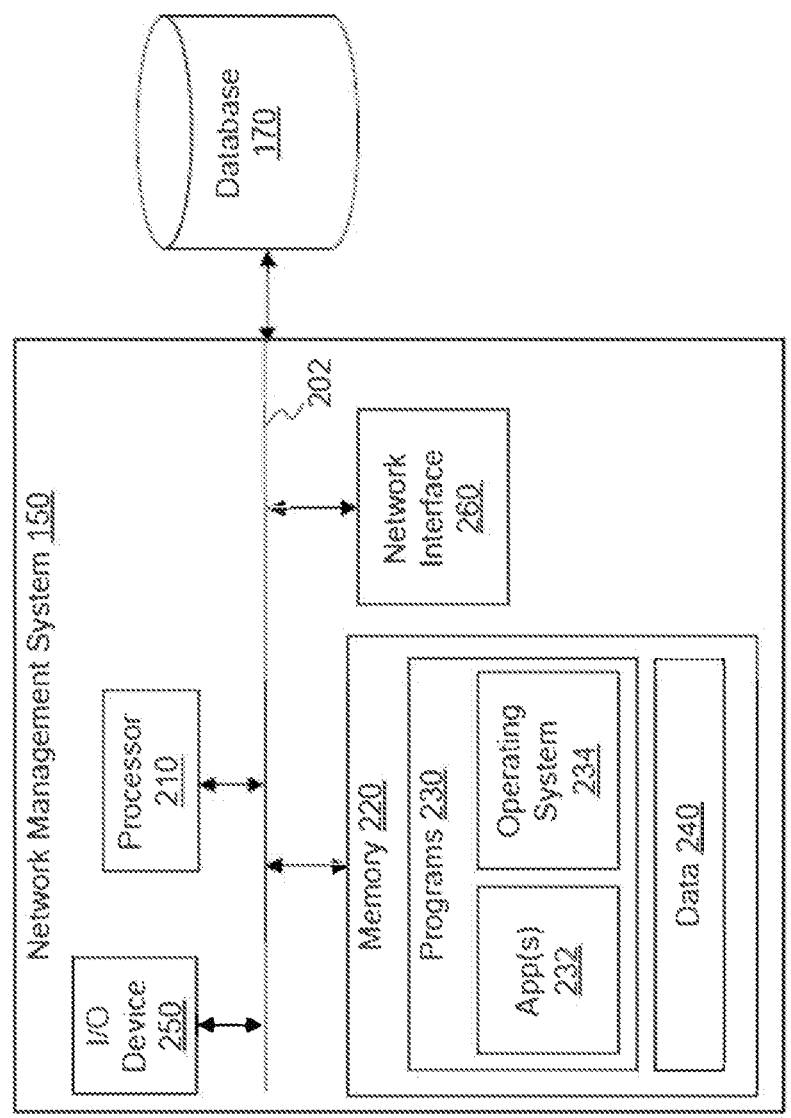
FIG. 2 depicts a diagram of an exemplary network management system, consistent with the disclosed embodiments.

FIG. 2 depicts a diagram of an exemplary network management system 150, consistent with the disclosed embodiments. Network management system 150 can be a computing device, such as a desktop, workstation, cluster, cloud computing platform, network appliance, or the like. Network management system 150 can be configured to perform systems and methods for managing a communication network, consistent with disclosed embodiments. Network management system 150 can be configured to determine network paths for satisfying a set of demands on a network, consistent with disclosed embodiments.

The network management system 150 can include a bus 202 (or other communication mechanism) which interconnects subsystems and components for transferring information within the network management system 150. As shown, the network management system 150 can include one or more processors 210, input/output ("I/O") devices 250, network interface 260 (e.g., a modem, Ethernet card, or any other interface configured to exchange data with a network), and one or more memories 220 storing programs 230 including, for example, server app(s) 232, operating system 234, and data 240, and can communicate with an external database 170 (which, for some embodiments, may be included within the network management system 150).

The processor 210 can be a central processing unit (CPU), graphical processing unit (GPU), application specific integrated circuit (ASIC) of system on a chip (SoC), field programmable gate array (FPGA), or the like. The processor 210 may comprise a single core or multiple core processors executing parallel processes simultaneously. For example, the processor 210 may be a single core processor configured with virtual processing technologies. In certain embodiments, the processor 210 may use logical processors to simultaneously execute and control multiple processes. The processor 210 may implement virtual machine technologies, or other technologies to provide the ability to execute, control, run, manipulate, store, etc. multiple software processes, applications, programs, etc. In some embodiments, the processor 210 may include a multiple-core processor arrangement (e.g., dual, quad core, etc.) configured to provide parallel processing functionalities to allow the network management system 150 to execute multiple processes simultaneously. It is appreciated that other types of processor arrangements could be implemented that provide for the capabilities disclosed herein.

The memory 220 may be a volatile or non-volatile, magnetic, semiconductor, tape, optical, removable, non-removable, or other type of storage device or tangible or non-transitory computer-readable medium that stores one or more program(s) 230 such as server apps 232 and operating system 234, and data 240. Possible forms of non-transitory media include, for example, a flash drive, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, or any other flash memory, NVRAM, a cache, a register, any other memory chip or cartridge, and networked versions of the same.

The network management system 150 may include one or more storage devices configured to store information used by processor 210 (or other components) to perform certain functions related to the disclosed embodiments. For example, the network management system 150 may include memory 220 that includes instructions to enable the processor 210 to execute one or more applications, such as server apps 232, operating system 234, and any other type of application or software known to be available on computer systems. Alternatively or additionally, the instructions, application programs, etc. may be stored in an external database 170 (which can also be internal to the network management system 150) or external storage communicatively coupled with the network management system 150 (not shown), such as one or more database or memory accessible over the network 140.

The database 170 or other external storage may be a volatile or non-volatile, magnetic, semiconductor, tape, optical, removable, non-removable, or other type of storage device or tangible or non-transitory computer-readable medium. The memory 220 and database 170 may include one or more memory devices that store data and instructions used to perform one or more features of the disclosed embodiments. The memory 220 and database 170 may also include any combination of one or more databases controlled by memory controller devices (e.g., server(s), etc.) or software, such as document management systems, Microsoft™ SQL databases, SharePoint databases, Oracle™ databases, Sybase™ databases, or other relational databases.

In some embodiments, the network management system 150 may be communicatively connected to one or more remote memory devices (e.g., remote databases (not shown)) through network 140 or a different network. The remote memory devices can be configured to store information that the network management system 150 can access and/or manage. By way of example, the remote memory devices could be document management systems, Microsoft™ SQL database, SharePoint databases, Oracle™ databases, Sybase™ databases, or other relational databases. Systems and methods consistent with disclosed embodiments, however, are not limited to separate databases or even to the use of a database.

The programs 230 include one or more software modules configured to cause processor 210 to perform one or more functions of the disclosed embodiments. Moreover, the processor 210 may execute one or more programs located remotely from one or more components of the communication network 100. For example, the network management system 150 may access one or more remote programs that, when executed, perform functions related to disclosed embodiments.

In the presently described embodiment, server app(s) 232 causes the processor 210 to perform one or more functions of the disclosed methods. For example, the server app(s) 232 cause the processor 210 to determine service routes and allocate resources for services to be delivered in the communication network 100.

In some embodiments, the program(s) 230 may include the operating system 234 performing operating system functions when executed by one or more processors such as the processor 210. By way of example, the operating system 234 may include Microsoft Windows™, Unix™, Linux™, Apple™ operating systems, Personal Digital Assistant (PDA) type operating systems, such as Apple iOS™, Google Android™, Blackberry OS™, or other types of operating systems. Accordingly, disclosed embodiments may operate and function with computer systems running any type of operating system 234. The network management system 150 may also include software that, when executed by a processor 210, provides communications with network 140 through the network interface 260 and/or a direct connection to one or more nodes 120A-120E.

In some embodiments, the data 240 may include, for example, network configurations, requirements of service demands, service paths for satisfying the service demands and relationships between the service paths, capacity of the network devices, and so on. For example, the data 240 may include network topology of the service network 160 and operating status (e.g., operating properly or not operating properly) of the communication link between the nodes 120. The data 240 may also include requirements of service demands and service paths for each service demand in the service network 160.

The network management system 150 may also include one or more I/O devices 250 having one or more interfaces for receiving signals or input from devices and providing signals or output to one or more devices that allow data to be received and/or transmitted by the network management system 150. For example, the network management system 150 may include interface components for interfacing with one or more input devices, such as one or more keyboards, mouse devices, and the like, that enable the network management system 150 to receive input from an operator or administrator (not shown).

Figure 3:
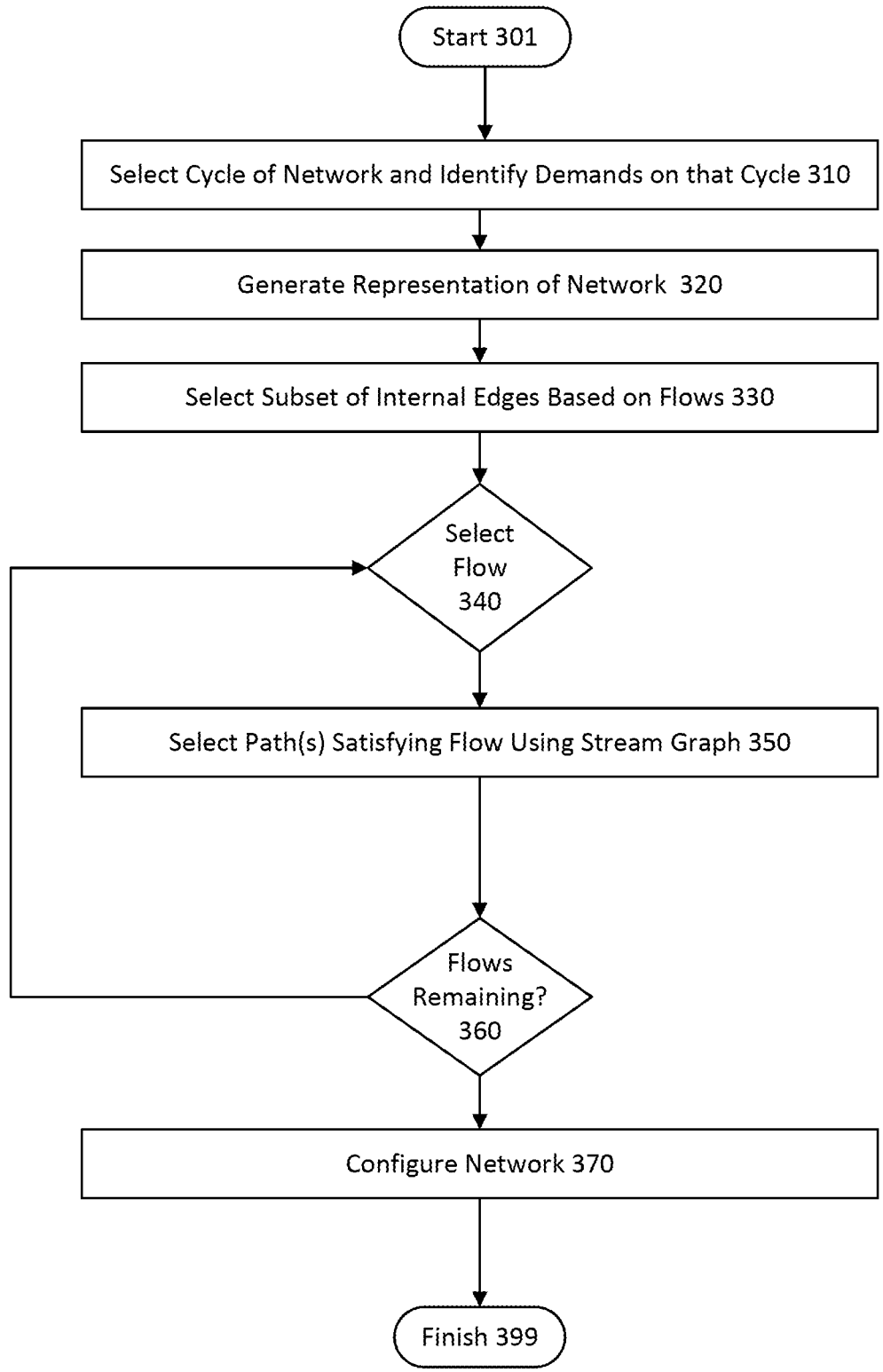
FIG. 3 depicts a process for configuring a network to satisfy a set of demands, consistent with disclosed embodiments.

FIG. 3 depicts a process 300 for configuring a network (e.g. service network 160, or the like) to satisfy a set of demands, consistent with disclosed embodiments. Process 300 can be performed by a computing system (e.g., network management system 150, or the like). The computing system can interact with the network and/or a database (e.g., database 170, or the like) to perform process 300. Consistent with disclosed embodiments, the computing system can provide instructions to nodes 120 to configure those nodes to implement the network path(s) determined by process 300.

In step 301, process 300 can start. In some embodiments, process 300 can occur according to a schedule. In various embodiments, process 300 can occur in response to an event. For example, the network management system can be provided with a set of demands. As an additional example, the network management system can be notified of a change in the state of the network (e.g., the addition, removal, failure, or restoration of one or more nodes or links, or the like). In some embodiments, process 300 can occur repeatedly. For example, as described herein, process 300 can include determining a demand on a network having the longest minimum-length path between source and target. This demand can be used to create a cycle. Process 300 can then determine a configuration for demands having both endpoints on that cycle. However, not all demands in the network may have endpoints both endpoints on that cycle. Thus process 300 can be repeated. In some embodiments, demands addressed in a previous iteration can be disregarded and a new cycle can be selected based on the remaining demands on the network. In some embodiments, process 300 can be repeated until all the demands in the network have been addressed.

In step 310, the computing system can select a cycle of a network. In some embodiments, the computing system can receive or retrieve a topology of the network from at least one of the database or node(s) of the network (e.g., one or more of nodes 120). In some embodiments, the computing system can generate the topology of the network. The network topology can be generated from link information, which can describe links between nodes in the network (or active links, or links with available capacity, or links meeting some other criteria). In some embodiments, link information can be provided by nodes in the network to the computing system, which can then generate the network topology. In various embodiments, link information can be provided by nodes in the network to the database, another node in the network, or to another system. The receiving node or other system may generate the network topology or may provide the link information to the computing system, which may generate the network topology. In some embodiments, link information can be provided by another system or by a user interacting with the computing system.

In some embodiments, the computing system can obtain a set of demands on the network. As described herein, the demands can indicate a source node and a target node. This indication can be express (e.g., specifying the source and target node) or implicit (e.g., a demand received by a particular node from a client device can be deemed to implicitly specify that particular node as the source node). The computing system can receive or retrieve demands from nodes, the database, or another system. In some embodiments, the nodes or other system can provide the demands directly to the computing system. In various embodiments, the nodes or other system can provide the demands indirectly to the computing system (e.g., by storing the demands in the database for retrieval by the computing device).

In some embodiments, the computing system can determine a minimum-length path along the network topology between a source node and a target node for each demand. The disclosed embodiments are not limited to any particular method of determining this minimum-length path. The computing system can select a demand based on the minimum-length path for that demand. In some embodiments, the computing system can select, from among the demands on the network, the demand with the longest minimum-length path. For example, the computing system can sort the demands in descending order of path length and select the first demand. The computing system can determine two fully disjoint paths in the network from the source node to the target node of the selected demand (e.g., using a maximum flow algorithm, or other suitable algorithm). The computing system can select the nodes and links that form these two paths as the cycle. The computing system can also select nodes and links that form paths that connect nodes on these two paths. Such nodes and links can form the internal edges of the cycle. As may be appreciated, certain nodes and links in the network may not fall on either disjoint path or be part of a path connecting two nodes on the disjoint paths. The computing system can select the demands with endpoints on the cycle. Process 300 can determine a configuration of the selected nodes that satisfies the demands having endpoints on the cycle.

Process 300 is not limited to any particular implementation of the network graph, the links, or the demands. In some embodiments, the graph, links, or demands can be stored or communicated using a data-interchange format (e.g., JSON, or the like), markup language (e.g., XML or the like), database format (e.g., ORACLE, MYSQL, or the like) spreadsheet format, or other suitable format.

Figure 7A:
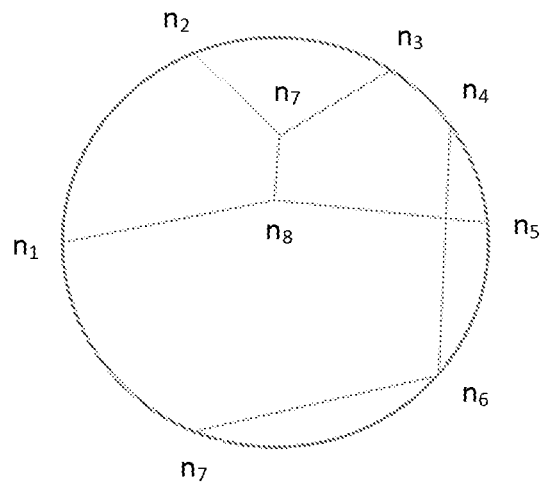
FIG. 7A depicts an exemplary communication network, consistent with disclosed embodiments.
Figure 7B:
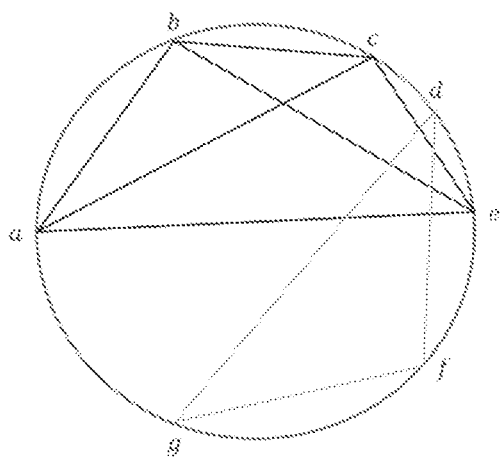
FIG. 7B depicts an exemplary network graph corresponding to the communication network of FIG. 7A, consistent with disclosed embodiments.

In step 320, the computing system can generate a representation of the selected cycle of the network. The representation can include a graph. The graph can include vertices corresponding to the nodes on the cycle, external edges corresponding to links connecting the nodes on the cycle, and internal edges. Each internal edge can represent a path on the network that connects two nodes on the cycle but is disjoint with the path defining the cycle. For example, in FIG. 7A, links $\{\{n_1, n_8\}, \{n_8, n_7\}, \{n_7, n_2\}\}$ defines a network path that connects nodes $n_1$ and $n_2$ but is disjoint with the network path defining the cycle. As shown in FIG. 7B, this network path corresponds to an internal path $\{a, b\}$ in the graph. The representation can include flows corresponding to the demands on the cycle. A flow corresponding to a demand can have as endpoints vertices that correspond to the endpoint nodes of the demand. A flow corresponding to a demand can have the same protection type as the corresponding demand.

In step 330, the computing system can select a subset of internal links in the network graph. Consistent with disclosed embodiments, the internal links can be selected based on flows corresponding to the set of demands obtained in step 320. In some embodiments, as described in greater detail with regards to FIG. 5, the computing system can generate a clique graph based on the flows. In some embodiments, as described in greater detail with regards to FIG. 4, the computing system can select a subset of the vertices on the clique graph. In some embodiments, the computing system can determine a minimal cost tree that connects certain vertices in the clique graph. The vertices on the minimal cost tree can correspond to sets of vertices on the network graph. The union of these sets of vertices can specify, for cliques on the network graph, a subset of the internal edges of those cliques. In some embodiments, the subset of internal edges selected in step 330 can be the union of these subsets of internal edges. In various embodiments, the computing system can determine the star set, for each clique, of the subset of the internal edges of that clique. In such embodiments, the subset of internal edges selected in step 330 can be the union of these star sets.

In step 340, one of the demands obtained in step 320 can be selected. Process 300 is not limited to any particular criterion for selecting a demand. In some embodiments, the computing system can track which demands obtained in step 320 have been selected (or which remain unselected). In step 340, the computing system can select a previously unselected demand. In some embodiments, a demand can be selected arbitrarily from among previously unselected demands. In various embodiments, a demand can be selected based on demand protection type, starting node (or source vertex of the flow corresponding to the demand), ending node (or target vertex of the flow corresponding to the demand), or some combination of the foregoing.

In step 350, one or more internal paths can be identified for the selected demand. In some embodiments, as described in greater detail with regards to FIG. 6, the computing system can generate a stream graph based on the flow corresponding to the demand. In some embodiments, the stream graph can include elements corresponding to the vertices of the network graph. A finishing element can correspond to the target vertex of the network graph and a starting element can correspond to the source vertex of the network graph. The stream graph can further include graph arc. Each graph arc can be directed away from the finishing graph element and towards the starting graph element. The stream graph can further include graph edges corresponding to the internal edges of the network graph. The graph edges may be undirected, or bidirectional, such that they can be traversed in either direction.

Consistent with disclosed embodiments, the computing system can determine a path through the stream graph from the starting element to the finishing element. The disclosed embodiments are not limited to any particular method of finding the path from the starting element to the finishing element. In some embodiments, a method adapted to solving maximum flow problems can be used to find the path. Consistent with disclosed embodiments, the computing system can determine the internal edges in the network graph that correspond to the graph edges on the path from the starting element to the finishing element. In some instances, this set of internal edges (e.g., the identified internal edges) can be sufficient to provide at least three pairwise edge-disjoint graph paths from the source vertex to the target vertex in the network graph.

Consistent with disclosed embodiments, the computing system can identify one or more graph paths using the identified internal edges. The number of graph paths identified can depend on the protection type. When the protection type is 1+R+R or 1+1+R, the computing system can identify one or two main graph paths, respectively.

In some embodiments, the computing system may associate the identified internal edges with the flow (or the demand corresponding to the flow). During an operational phase, in response to a failure of a link corresponding to an edge on a main graph path, the computing system may use the identified internal edges to identify a recovery graph path disjoint with the edge in the graph that corresponds to the failed link. As with the original main graph path identification, the disclosed embodiments are not limited to any particular method of identifying such a path.

In various embodiments, when the protection type is 1+R+R or 1+1+R, the computing system can determine, during a planning phase, one or more recovery graph paths for a main graph path (e.g., a predetermined recovery path). In some instances, a predetermined recovery graph path for a main graph path can accommodate failed link(s) corresponding to edge(s) on the main graph path. In some embodiments, an overall set of recovery graph paths for an identified graph path may accommodate any single failed link corresponding to any single edge on the identified graph path. In some embodiments, the computing system can determine, during a planning phase, one or more secondary recovery graph paths for a primary recovery graph path (e.g., a predetermined secondary recovery path). In some instances, a predetermined secondary recovery path for a primary recovery graph path can accommodate failed link(s) corresponding to edge(s) on a main graph path and the primary recovery graph path.

When the protection type is 1++, the computing system can determine three pairwise edge disjoint graph paths using the identified internal edges. As opposed to the graph paths determined for 1+R+R and 1+1+R protection types, the graph paths determined for demands having a 1++ protection type may be pairwise disjoint for both internal and external edges on the graph. In some embodiments, the computing system can determine the three pairwise disjoint edges during a planning phase. In various embodiments, the computing system can associate the identified internal edges with the demand. During an operational phase, in response to a failure of a link corresponding to an edge on an identified graph path, the computing system can use the identified internal paths to determine a graph path pairwise disjoint to the identified graph path.

Consistent with disclosed embodiments, when the protection type for a demand requires pairwise disjoint internal edges (e.g., a 1++ protection type) the computing system can determine whether ones of the identified internal edges correspond to intersecting links in the network. Such internal edges can be replaced with express internal edges prior to identification of the graph paths.

In step 360, the computing system can determine whether graph path(s) have been identified for all demands obtained in step 320. When graph path(s) have not been determined for all demands, process 300 can return to step 340 and a new demand can be selected. When graph path(s) have been determined for all demands, process 300 can proceed to step 370.

In step 370, the computing system can provide instructions to configure the network to satisfy the demands obtained in step 320. In some embodiments, the computing system can provide the instructions directly to each node of the network that requires configuration. In various embodiments, the computing system can provide the instructions indirectly to such nodes. The computing system can provide the instructions to one node, which may then relay the instructions to other nodes. The computing system can provide the instructions to another system that then provides instructions (e.g., based on the instructions received from the computing system) directly or indirectly to each node of the network that requires configuration. In some embodiments, the instructions can specify routes and wavelength assignments for the demands. In some embodiments, the instructions can be sufficient to configure hardware-based or software-based switches, routers, splitters, or the like to satisfy the demands. The disclosed embodiments are not limited to any particular implementation of these instructions.

Figure 4:
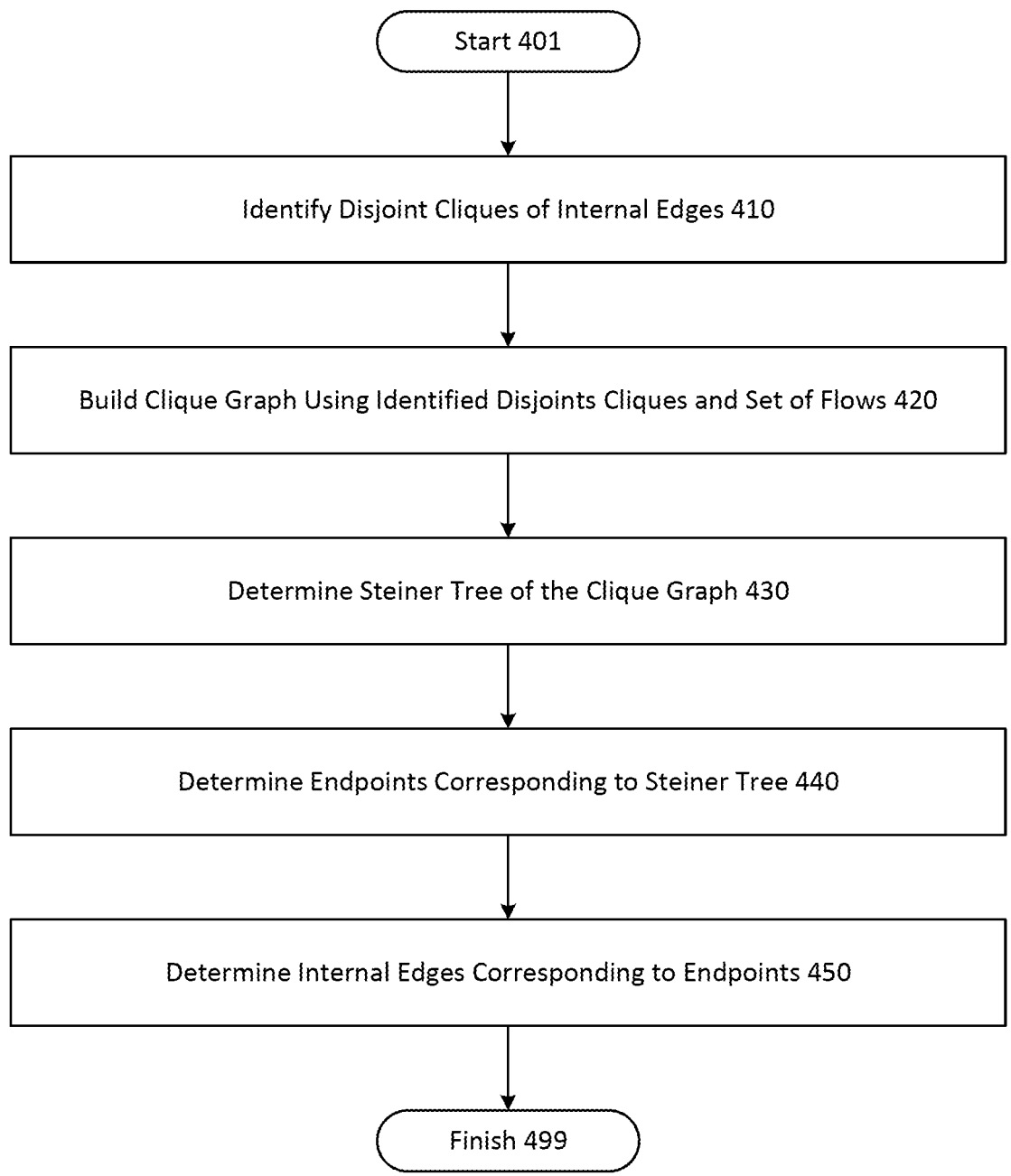
FIG. 4 depicts a process for selecting a set of internal edges on a network graph based on a set of flows, consistent with disclosed embodiments.

FIG. 4 depicts a process 400 for selecting a set of internal edges on a network graph based on a set of flows, consistent with disclosed embodiments. Process 400 can be performed by a computing system (e.g., network management system 150, or the like). The computing system can interact with the network and/or a database (e.g., database 170, or the like) to perform process 400. Process 400 can include creating a clique graph based on the graph of the network, determining a minimal cost tree over that clique graph, and using the minimal cost tree to select an overall set of internal edges. In some embodiments, process 400 can be performed as part of process 300.

In step 401, the computing system can begin process 400. The computing system may obtain or have previously obtained a graph representing a network, or node and link information describing the network (which the computing system can convert into a graph representing the network). As depicted in FIG. 7A, a network can include nodes $n_1$ to $n_8$. These nodes can be connected by links. As depicted in FIG. 7B, a graph corresponding to the network of FIG. 7A can include vertices a, b, c, d, e, f, and g. These vertices can be connected by edges. A cycle can be defined on the network that includes vertices a, b, c, d, e, f, and g. The edges connecting these vertices can be external edges. As depicted in FIG. 7B, the graph can be modified to represent internal nodes (e.g., $n_7$ and $n_8$) and the links connecting them with an equivalent set of edges that directly connect vertices on the cycle. For example, the network path from n1 to n2 through n8 and n7 can be represented with a single edge from a to b.

In step 410, the computing system can identify disjoint cliques of internal edges. In some embodiments, disjoint cliques can be cliques that do not share vertices. In the example depicted in FIG. 7B, the graph can include two disjoint clients, the first having vertices a, b, c, and e, and the second having vertices d, f, and g. These cliques include crossing internal paths (e.g., {c, e} and {d, f}) and therefore are crossing internal cliques.

Figure 8:
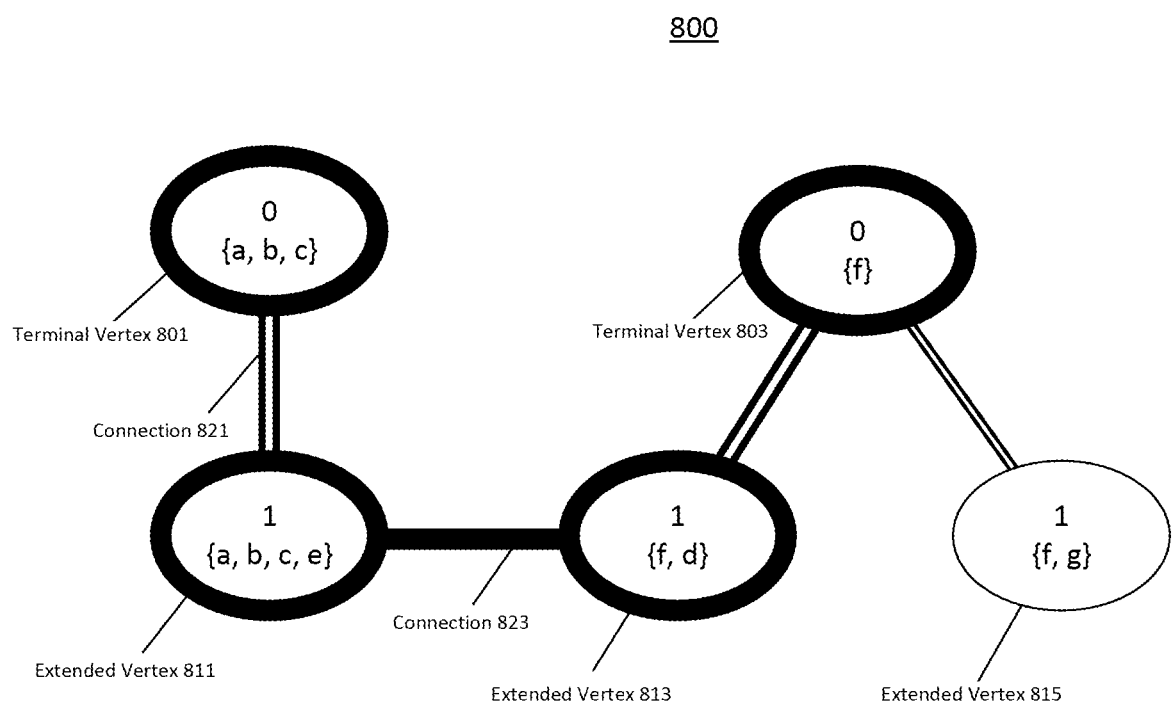
FIG. 8 depicts a clique graph constructed for the network graph of FIG. 7B according to the process of FIG. 5, consistent with disclosed embodiments.

In step 420, the computing system can build a clique graph using the identified disjoint cliques and a set of flows on the graph. The flows can correspond to a set of demands on the network (e.g., the set of demands obtained in step 310 of process 300, or the like). As illustrated in FIG. 8 described in more detail in FIG. 5, the clique graph can include vertices and connections. Vertices on the clique graph can include terminal vertices and extension vertices. An extension vertex can extend a terminal vertex or another extension vertex (e.g., the extended vertex). A vertex on the clique graph can correspond to a set of endpoints for one of the identified disjoint cliques (e.g., a vertex-level endpoint subset). An extension vertex can correspond to a union of the vertex-level endpoint subset for the extended vertex and one or more additional endpoints. A connection can link an extension vertex and the vertex extended by that extension vertex. A connection can link two vertices that corresponding to endpoints that define crossing sets.

In step 430, the computing system can identify a minimal cost tree that connects all the terminal vertices on the clique graph (e.g., a Steiner tree of the clique graph, or the like). In some embodiments, the computing system can assign weights to vertices on the graph. The computing system can assign higher weights to extension vertices that terminal vertices (e.g., terminal vertices can be assigned a weight of 0 and extension vertices can be assigned a weight of 1). For example, FIG. 8 depicts such a tree connecting terminal vertex 801, extended vertex 811, extended vertex 813, and terminal vertex 803.

In step 440, the computing system can identify the endpoints on the network graph that correspond to the vertices on the minimal cost tree. As described above, a vertex on the clique graph can correspond to a vertex-level endpoint subset. The set of vertices included in the minimal cost tree therefore corresponds to a set of vertex-level endpoint subsets. The computing system can construct clique-level endpoint subsets as the union of the vertex-level endpoint subsets for each clique. For example, in FIG. 8, the clique-level endpoint subsets can be:

$$C_1 = \{a,b,c,e\}$$

$$C_2 = \{f,d\}$$

In step 450, the computing system can select internal edges corresponding to the endpoints identified in step 440. The clique-level endpoint subset for each disjoint clique can specify a subset of the internal edges (e.g., a clique-level edge subset) for that clique (e.g., the internal edges having as endpoints the endpoints in the clique-level endpoint subset). In some embodiments, the internal edges selected for a disjoint clique can be the clique-level edge subset for that clique. For example, FIG. 9A depicts the set of internal edges corresponding to the clique-level endpoint subset $C_1$ and FIG. 9B depicts the set of internal edges corresponding to the clique-level endpoint subset $C_2$. In various embodiments, the computing system can determine a star set of internal edges for the clique-level edge subset. The star set of internal edges can be the internal edges selected for a disjoint clique. In some implementations, for a clique including N vertices, the star set can be the set of edges connecting $v_i$ with $$v_{i+1 \lfloor \frac{|N|+1}{2} \rfloor}$$

for $$1 \le i \le \left\lfloor \frac{|N|+1}{2} \right\rfloor,$$

or a similar formula. The overall set of internal edges selected by process 400 can be the union of the internal edges selected for each disjoint set.

In step 499, the computing system can finish process 400. In some embodiments, the computing system can use the overall set of internal edges determined by process 400 to identify graph paths for satisfying flows on the graph (and corresponding demands on the network). In various embodiments, process 400 can be performed as part of a larger process (e.g., process 300).

Figure 5:
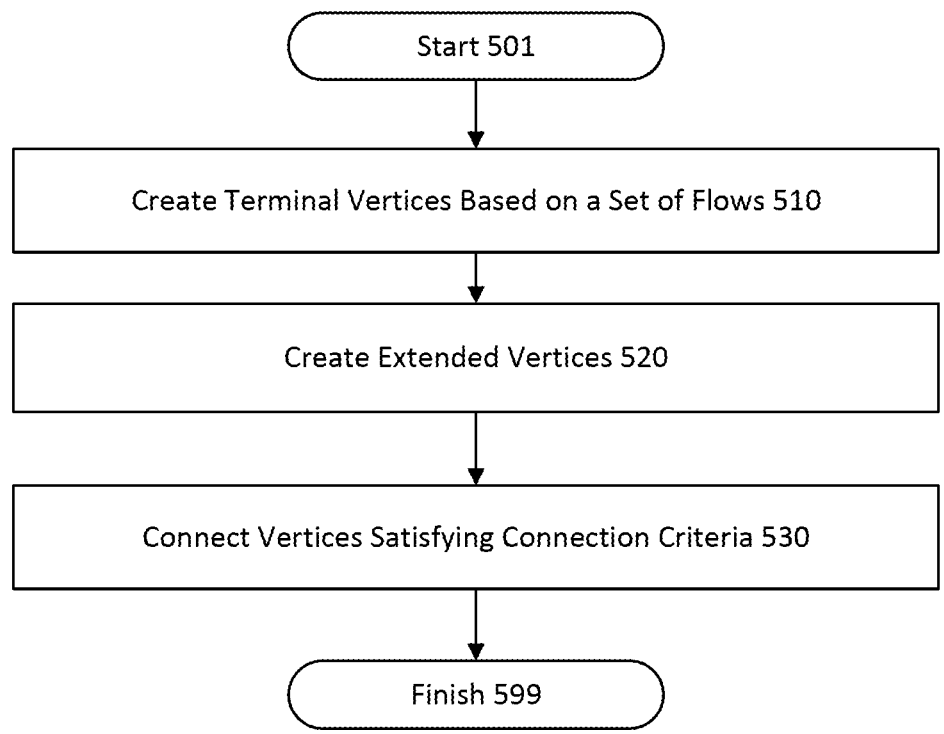
FIG. 5 depicts a process for building a clique graph using disjoint cliques on a network graph and a set of flows for the network graph, consistent with disclosed embodiments.

FIG. 5 depicts a process 500 for building a clique graph using disjoint cliques on a network graph and a set of flows for the network graph, consistent with disclosed embodiments. Process 500 can be performed by a computing system (e.g., network management system 150, or the like). The computing system can interact with the network and/or a database (e.g., database 170, or the like) to perform process 500. Process 500 can include creating terminal vertices based on the set of flows, creating extension vertices, and connecting the terminal and extension vertices to form the clique graph. In some embodiments, process 500 can be performed as part of process 300.

In step 501, the computing system can begin process 500. The computing system may obtain or have previously obtained a graph representing a network, or node and link information describing the network. The computing system may obtain or have previously obtained flows (or demands corresponding to the flows). A flow can specify a source and a target vertex on the network graph. In the example provided in FIG. 7A, the network can have the following demands:

$$d_1 = \langle n_1, n_6, 1_{++} \rangle$$

$$d_2 = \langle n_2, n_3, 1_{++} \rangle$$

$$d_3 = \langle n_3, n_3, 1+1+R \rangle$$

$$d_4 = \langle n_1, n_3, 1_{++} \rangle$$

These demands can be represented on the graph of the network depicted in FIG. 7B as follows:

$$f_1 = \langle a, f, 1_{++} \rangle$$

$$f_2 = \langle b, c, 1_{++} \rangle$$

$$f_3 = \langle b, c, 1+1+R \rangle$$

$$f_4 = \langle a, c, 1_{++} \rangle$$

As previously described, the graph of the network depicted in FIG. 7B includes two cliques:

$$N_1 = \{\{a,b\},\{a,c\},\{a,e\},\{b,c\},\{b,e\}\}$$

$$N_2 = \{\{d,f\},\{d,g\},\{f,g\}\}$$

Each of these cliques has a corresponding set of vertices:

$$V_{N_1} = \{a,b,c,e\}$$

$$V_{N_2} = \{d,f,g\}$$

In step 510, the computing system can create terminal vertices in the clique graph using the set of flows. The computing system can create a union of the source and target vectors of the flows in the set of flows:

$$R = \{a,b,c,f\}$$

The computing system can derive a terminal vertex for each clique in the network graph. The terminal vertex for a clique can correspond to the intersection of the set of vertices for the clique and R:

$$T_{N_1} = V_{N_1} \cap R$$

$$T_{N_2} = V_{N_2} \cap R$$

In some embodiments, when the intersection of the set of vertices for a clique and R is a null set (e.g., there are no target or source vertices on that clique), a terminal vertex for that clique can correspond to a selected one of the vertices for that clique. In some such embodiments, the selected one of the vertices can be arbitrarily selected. In the example depicted in FIG. 8, terminal vertex 801 can correspond to vertices $T_{N_1}$ of clique $N_1$ and terminal vertex 803 can correspond to vertices $T_{N_2}$ of clique $N_2$.

In step 520, the computing system can create extended vertices in the clique graph. Consistent with disclosed embodiments, the computing system can derive zero or more extension vertices for each terminal vertex. The terminal vertex can correspond to a particular clique and correspond to a particular subset of the set of vertices for that particular clique. An extension vertex for that terminal vertex can correspond to a subset of the set of vertices for the clique as follows:

$$B_{ij} = \{T_{N_i} \cup u_j | u_j \in V_{N_i} \backslash T_{N_i}\}$$

Where $B_{ij}$ is the set of vertices for the jth extension vertex of the ith clique.

The terminal vertex for the ith clique, can be extended by a number of extension vertices equal to the size of $V_{N_i} \backslash T_{N_i}$. The jth such extension vertex will correspond to all the vertices in $T_{N_i}$, plus one more vertex in $V_{N_i} \backslash T_{N_i}$. In some embodiments, each extension vertex can be further extended with zero or more additional extension vertices as follows:

$$C_{ijk} = \{B_{ij} \cup v_k | v_k \in V_{N_i} \backslash B_{ij}\}$$

Where $C_{ijk}$ is the set of vertices for the kth extension vertex of the jth extension vertex of the ith clique. As may be appreciated, the process of generating extension vertices can be further continued.

In the example depicted in FIG. 8, extended vertex 811 can correspond to vertices $B_{11}$ of clique $N_1$, extended vertex 813 can correspond to vertices $B_{21}$ of clique $N_2$, and extended vertex 815 can correspond to vertices $B_{22}$ of clique $N_2$.

In step 530, the computing system can connect vertices in the clique graph according to connection criteria. Consistent with disclosed embodiments, the computing system can connect an extension vertex with the vertex that it extends (e.g., connection 821 of FIG. 8). Consistent with disclosed embodiments, the computing system can connect vertices corresponding to crossing sets of internal edges. For example, extended vertex 811 corresponds to the set of vertices {a, b, c, e}, which defines the set of internal edges {{a, b}, {a, c}, {a, e}, {b, c}, {b, e}}, and extended vertex 813 corresponds to the set of vertices {f, d}, which defines the set of internal edges {{f, d}}. Internal edges {b, e} and {f, d} are crossing edges, and therefore extended vertex 811 and extended vertex 813 correspond to crossing sets.

In step 599, the computing system can finish process 500. In some embodiments, having determined the clique graph, the computing system can then find a minimal cost tree over the clique graph that connects all the terminal nodes. As described herein, the computing system can assign a lesser weight to terminal vertices and a greater weight to extension vertices. In some embodiments, the weight assigned to a terminal vertex for a clique can depend on whether the intersection of the set of vertices for that clique and R is a null set. In some embodiments, when the intersection is a null set, the weight can be greater than when the intersection is not a null set. For example, the computing system can assign a weight of 1 to such terminal vertices. The computing system can also assign a weight of 1 to extension vertices and a weight of 0 to the remaining terminal vertices.

Figure 6:
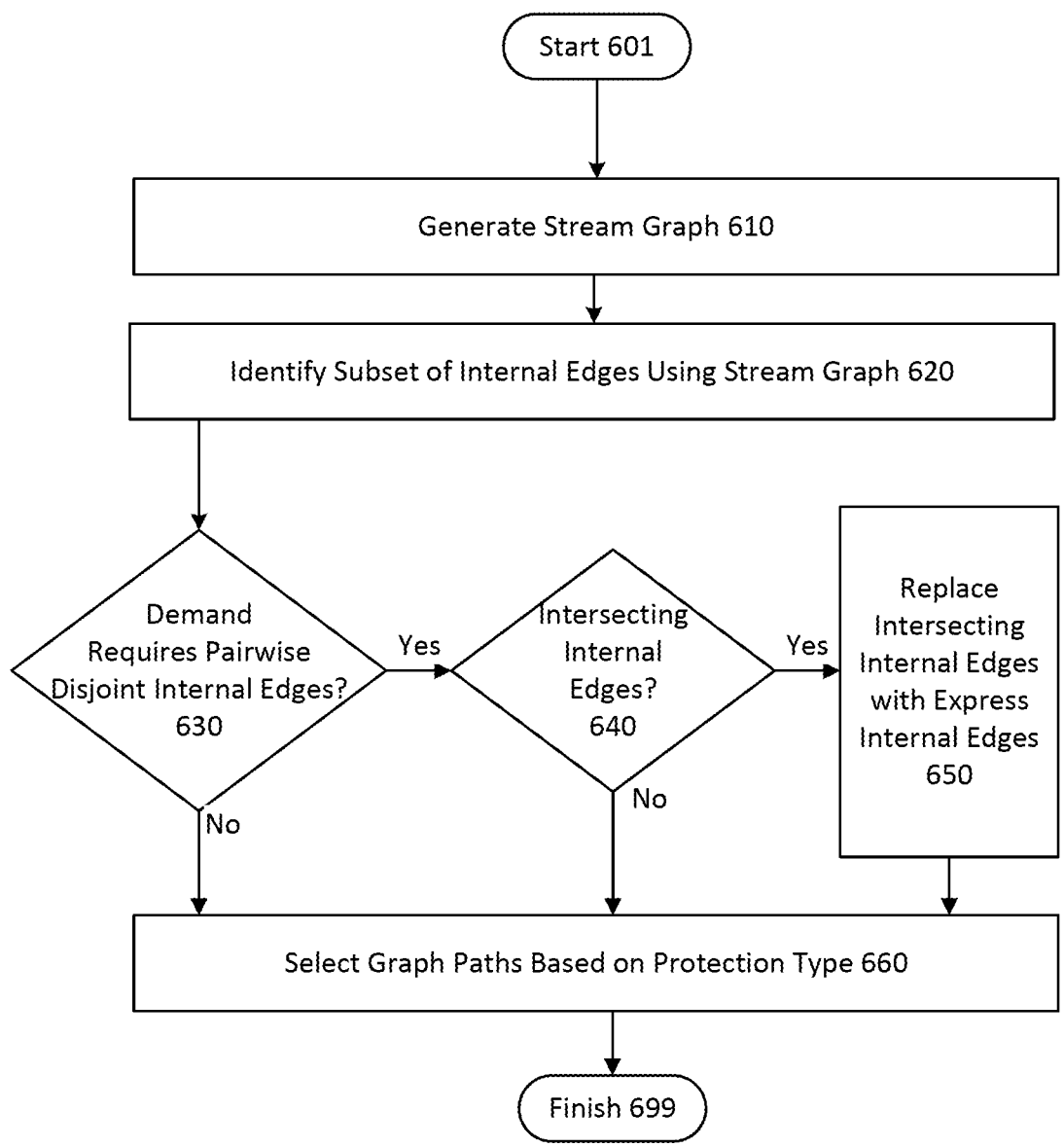
FIG. 6 depicts a process for selecting a graph path for a flow using a stream graph, consistent with disclosed embodiments.

FIG. 6 depicts a process 600 for selecting a graph path for a flow using a stream graph, consistent with disclosed embodiments. Process 600 can be performed by a computing system (e.g., network management system 150, or the like). The computing system can interact with the network and/or a database (e.g., database 170, or the like) to perform process 600. Process 600 can include creating terminal vertices based on the set of flows, creating extension vertices, and connecting the terminal and extension vertices to form the clique graph. In some embodiments, process 600 can be performed as part of process 300.

In step 601, the computing system can begin process 600. In some embodiments, the computing system can obtain a graph of a network. The network graph can include internal edges. In some embodiments, the internal edges may be a subset of the internal edges initially present on the network graph. For example, the internal edges may have been selected (e.g., by the computing system or another system) using process 400, or another process. In some embodiments, the computing system can obtain a flow. For example, the flow may have been selected (e.g., in step 340 of process 300) from among flows associated with the network graph.

In step 610, the computing system can generate a stream graph using the network graph. The stream graph can include elements corresponding to the vertices of the network graph. A source element can correspond to the source vertex for the selected flow. A target element can correspond to the target vertex for the selected flow. The stream graph can include undirected or bidirectional graph edges corresponding to the internal edges of the network graph. The stream graph can include graph arc corresponding to the external edges of the network graph. The graph arcs can be directed. The direction of the graph arcs can depend on the selected flow. The graph arcs can be directed away from the target element and towards the source element.

In step 620, the computing system can identify a subset of internal edges using the stream graph, consistent with disclosed embodiments. The computing system can determine a directed path through the stream graph from the source element to the target element. The directed path can traverse graph edges in any direction and traverse graph arcs in the direction of the graph arc. The disclosed embodiments are not limited to any particular method of finding this path. In some embodiments, a maximum flow method, or another suitable method, can be used to find the path. Consistent with disclosed embodiments, the computing system can be configured to identify the internal edges corresponding to the graph edges on the path. The computing system can use these edges when determining a graph path for the flow.

In step 630, the computing system can determine whether the flow (or the corresponding demand) requires that graph paths satisfying the flow have pairwise disjoint internal edges. As described herein, a 1+1+R demand or a 1+R+R demand does not require that graph paths satisfying the corresponding flow have pairwise disjoint internal edges. Thus when the demand is a 1+1+R or a 1+R+R demand (or other demand not requiring disjoint internal edges), process 600 can proceed to step 660. In contrast, a 1++ demand requires that graph paths satisfying the corresponding flow have disjoint internal edges. Thus when the demand is a 1++ demand (or other demand requiring disjoint internal edges), process 600 can proceed to step 640.

In step 640, the computing system can determine whether the internal edges identified in 620 are intersecting internal edges, consistent with disclosed embodiments. In some embodiments, intersecting internal edges can be internal edges corresponding to the same links or nodes in the network. For example, edges {a, b}, {a, c}, {a, e}, {b, c}, and {b, e} all correspond to, in part, the link connecting N8 and N7. A failure of this link would cause all of these edges to fail. Thus these edges are not truly disjoint. When internal edges selected in step 620 intersect, process 600 can proceed to step 650, otherwise process 600 can proceed to step 660.

In step 650, the computing system can replace intersecting internal edges with express internal edges. In some embodiments, the computing system can determine two endpoints for the express internal edge. A first endpoint can be the vertex in the network graph corresponding to the element on the directed path closest to the target element. A second endpoint can be the vertex in the network graph corresponding to the element on the directed path closest to the source element. The computing system can select as the express internal edge the internal edge in the network graph having as endpoints the first and second endpoints. In some embodiments, step 650 can be repeated until no intersecting internal edges remain among the edges selected in step 620.

In step 660, the computing system can select one or more graph paths, based on the protection type of the demand. When the demand has a 1+1+R or 1+R+R protection type, the computing system can use a path-finding algorithm to identify one or more graph paths from the source vertex to the target vertex using the internal edges selected in step 620. In some embodiments, the identified graph paths can include: a first path along the upper set of external edges connecting the source and target vertices and a second path along the lower set of external edges connecting the source and target vertex. In some embodiments, these two paths along the external edges can be the main paths, while a path using one of the internal edges selected in step 620 can be a recovery path.

In some embodiments, the computing system can determine multiple recovery paths during a planning phase, each being pairwise disjoint with a different edge on a main graph path (or another recovery path). The computing system can obtain an indication of functional edges on the network graph. The set of functional edges can exclude an edge on the main graph path (or an edge on the main graph path and an edge on a recovery path). The computing system can then determine a recovery path restricted to the functional external edges and an intersection of the functional internal edges and the internal edges selected in step 620. The predetermined set of multiple recovery paths can be stored. During an operational phase, in response to receipt of an indication that an identified graph path (or recovery path) is not longer valid (e.g., a link corresponding to an edge on the main graph path failed, or the like), the computing system can identify a predetermined recovery path corresponding to the invalid edge and provide instructions to configure the network to use a network path corresponding to the predetermined recovery path to satisfy the demand.

In some embodiments, the computing system can determine a recovery path during an operational phase. The computing system can associate the internal edges selected in step 620 with the demand. During the operational phase and in response to an indication that a main graph path (or recovery path) includes an edge corresponding to a failed link, the computing system can use the internal edges associated with the demand to find a recovery graph path. The computing system can obtain an indication of functional edges on the network graph. The functional edges can include external and internal edges. The computing system can then determine a recovery path restricted to the functional external edges and an intersection of the functional internal edges and the internal edges selected in step 620 and associated with the demand. In this manner, the computing system can determine a recovery graph path that is pairwise disjoint with the edge corresponding to the failed link (and with any other edges corresponding to failed links). The computing system can then provide instructions to configure the network to use a network path corresponding to the determined recovery path to satisfy the demand.

When the demand has a 1++ protection type, the computing system can use a path-finding algorithm to identify three fully edge-disjoint graph paths using the selected internal edges. As may be appreciated, such graph paths may include a combination of internal and external edges. In some embodiments, the computing system can determine two main graph paths, then associate the internal edges with the demand. In response to an indication that one of the main graph paths includes an edge corresponding to a failed link, the computing system can determine another graph path using the internal edges associated with the demand.

In step 699, the computing system can finish process 600. In some embodiments, the computing system can convert the graph path(s) identified in process 600 into network path(s) (e.g., routes, wavelength assignments, and the like for nodes in the network). The computing system can provide instructions to configure the network to implement these network path(s) to satisfy the demand. As described herein, these instructions can be provided directly or indirectly to the nodes of the network that require configuration to implement the network path(s).

Configuring an Exemplary Communication Network to Address 1+R+R, 1+1+R and 1++ Demands FIG. 7A depicts an exemplary communication network 710, consistent with disclosed embodiments. As described herein and depicted in FIG. 7B, a computing system can be configured to generate a network graph 720 that represents communication network 710. Network graph 720 includes internal edges in place of nodes $n_7$ and $n_8$ and the links that connect these nodes with nodes on the cycle. The internal edges form two disjoint cliques, as described herein.

FIG. 8 depicts a clique graph 800 constructed for network graph 720 according to process 500. Clique graph 800 includes terminal vertices 801 and 803, and extension vertices 811, 813, and 815. In this example, the extension vertices are not further extended. The bolded vertices and connections indicate a minimal cost tree connecting the terminal vertices. As described herein, the corresponding clique-level endpoints subsets are:

$$C_1 = \{a,b,c,e\}$$

$$C_2 = \{f,d\}$$

FIG. 9A depicts a star set of internal edges (e.g., {{a, c}, {e, b}}) for $C_1$ (e.g., star set 910). FIG. 9B depicts a star set of internal edges ({{d, f,}}) for $C_2$ (e.g., star set 920).

Figure 10A:
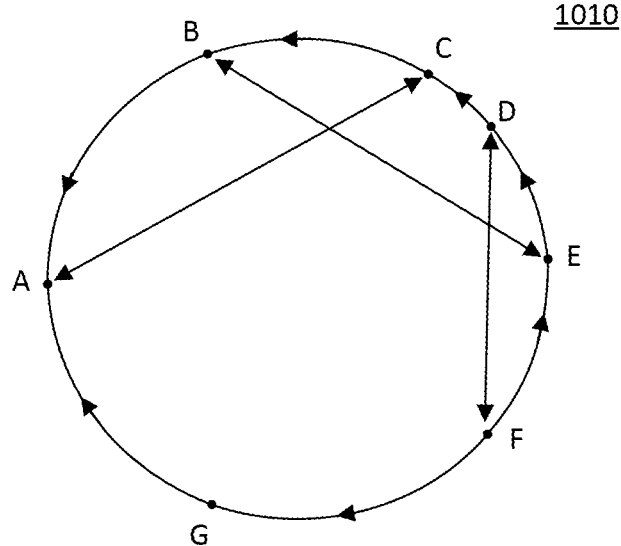
FIGS. 10A to 10D, 11A to 11D, 12, and 13A to 13C depict identification of graph paths for various flows on the graph network of FIG. 7B in accordance with the process of FIG. 6 and consistent with disclosed embodiments.
Figure 10B:
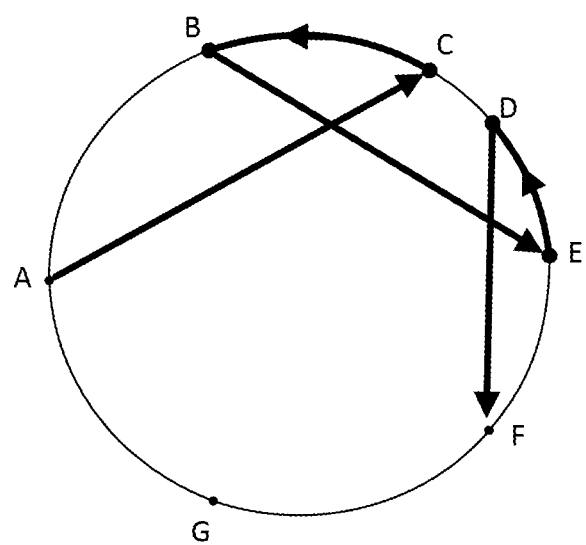
Figure 10C:
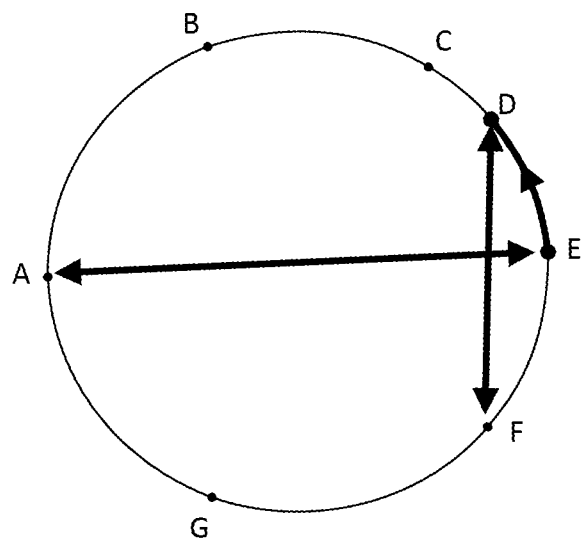
Figure 10D:
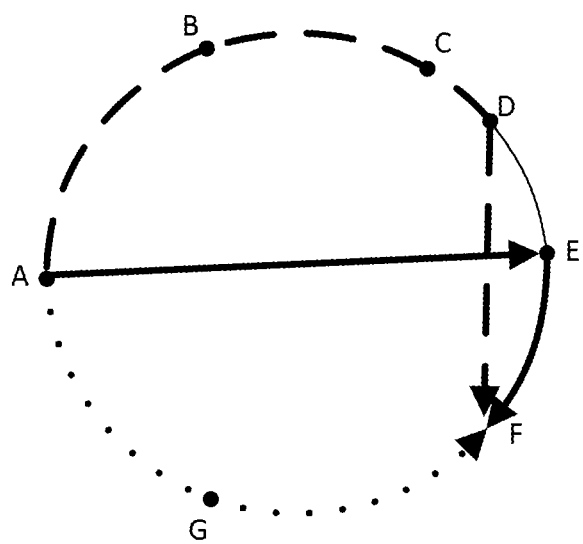

FIGS. 10A to 10D depict identification of graph paths for a flow $f_1 = \langle a, f, 1_{++} \rangle$ on graph network 720 according to process 600. FIG. 10A depicts stream graph 1010, generated using the cycle of network graph 720 and the internal edges in the star sets depicted in FIGS. 9A and 9B. Stream graph 1010 includes bidirectional graph edges corresponding to internal edges in network graph 720 and graph arcs that are directed from target element f (corresponding to target vertex f of the network graph) to source element a (corresponding to source vertex a of the network graph). FIG. 10B depicts stream graph 1020, which depicts a path on the stream graph from the source element to the target element. The graph edges on the path in the stream graph correspond to internal edges in the network graph. These corresponding internal edges can be used to find graph paths for satisfying the flow. In accordance with process 600, because the flow has a 1++ protection type, intersecting internal edges on the network graph must be replaced with express internal edges. FIG. 10C depicts stream graph 1030, which depicts a path on the stream graph from the source element to the target element with the graph edges corresponding to intersecting internal edges removed. In some embodiments, the computing system may calculate a path on an updated stream graph that reflects replacement of graph edges corresponding to intersecting edges with graph edges corresponding to express edges. In various embodiments, the computing system can replace the intersecting internal edges with an express internal edge without recalculating the stream graph. In some embodiments, the computing system can replace the intersecting internal edges with an express internal edge before calculating the stream graph. FIG. 10D depicts network graph 1040, which includes the internal edges of network graph 720 usable to identify graph paths that satisfy the flow. Network graph 1040 shows three graph paths, two of which each use one of the selected internal edges. These graph paths are fully internal edge disjoint and satisfy the flow $f_1$ on network graph 720. The computing system can determine instructions for implementing corresponding network paths on network 710. For example, the computing system can provide instructions to node $n_1$ of network 710 to route communications associated with demand $d_1$ (corresponding to flow $f_1$) to node $n_8$; provide instructions to node $n_8$ to route such communications to node $n_5$; and provide instructions to node $n_5$ to route such communications to node $n_6$.

Figure 11A:
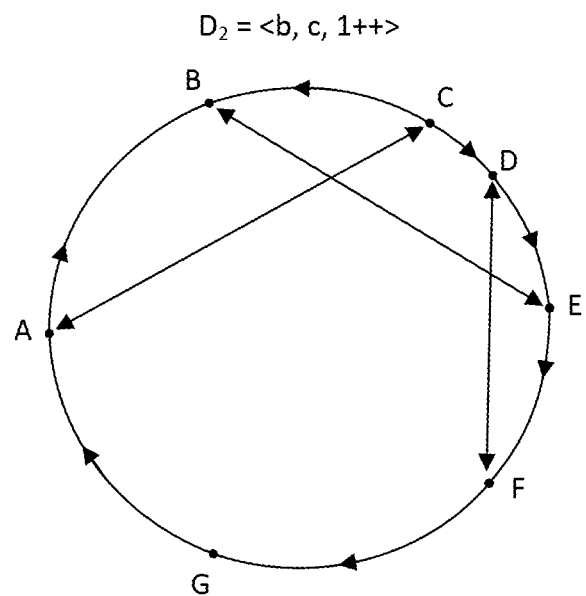
Figure 11B:
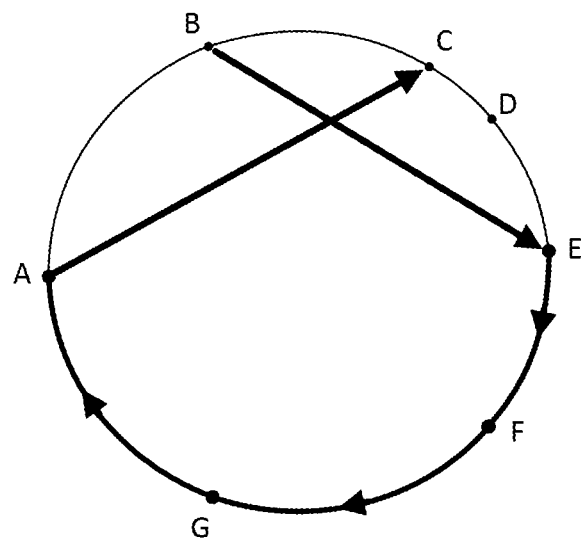
Figure 11C:
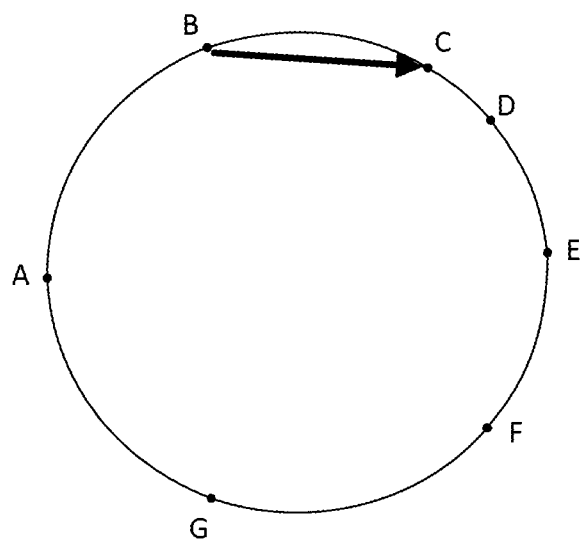
Figure 11D:
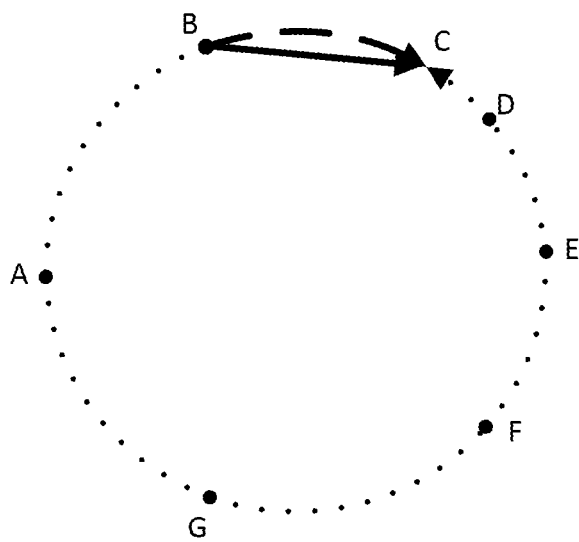

FIGS. 11A to 11D depict identification of graph paths for a flow $f_2$=<b, c, $1_{++}$> on graph network 720 according to process 600. FIG. 11A depicts stream graph 1110, generated using the cycle of network graph 720 and the internal edges in the star sets depicted in FIGS. 9A and 9B. Stream graph 1110 includes bidirectional graph edges corresponding to internal edges in network graph 720 and graph arcs that are directed from target element c (corresponding to target vertex c of the network graph) to source element b (corresponding to source vertex b of the network graph). FIG. 11B depicts stream graph 1120, which depicts a path on the stream graph from the source element to the target element. The graph edges on the path in the stream graph correspond to internal edges in the network graph. These corresponding internal edges can be used to find graph paths for satisfying the flow. In accordance with process 600, because the flow has a 1++ protection type, intersecting internal edges on the network graph must be replaced with express internal edges. FIG. 11C depicts stream graph 1130, which depicts a path on the stream graph from the source element to the target element with the graph edges corresponding to intersecting internal edges removed. In some embodiments, the computing system may calculate a path on an updated stream graph that reflects replacement of graph edges corresponding to intersecting edges with graph edges corresponding to express edges. In various embodiments, the computing system can replace the intersecting internal edges with an express internal edge without recalculating the stream graph. In some embodiments, the computing system can replace the intersecting internal edges with an express internal edge before calculating the stream graph. FIG. 11D depicts network graph 1140, which includes the internal edges of network graph 720 usable to identify graph paths that satisfy the flow. Network graph 1140 shows three graph paths, one of which uses the sole selected internal edges. These graph paths are fully internal edge disjoint and satisfy the flow $f_2$ on network graph 720. The computing system can determine instructions for implementing corresponding network paths on network 710. For example, the computing system can provide instructions to node $n_2$ of network 710 to route communications associated with demand $d_2$ (corresponding to flow $f_2$) to node $n_7$ and provide instructions to node $n_7$ to route such communications to node $n_3$.

Figure 12:
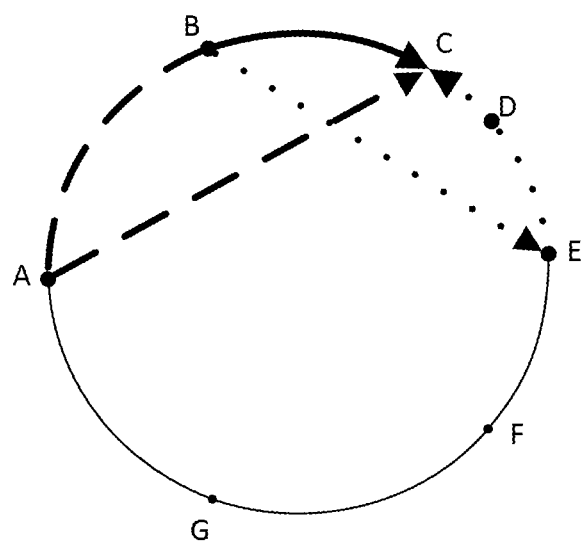

FIG. 12 depicts identification of graph paths for a flow $f_3$=<b, c, 1+1+R> on graph network 720 according to process 600. In accordance with process 600, a stream graph similar to stream graph 1110 can be constructed, as $f_3$ and $f_2$ have the same endpoints. A path can be found over the stream graph, similar to the path depicted on stream graph 1120. However, flow $f_3$ has a 1+1+R protection type and therefore does not require disjoint internal edges. Therefore the computer system does not replace intersecting internal edges {a, c} and {b, e} with an express edge prior to determining graph paths. Instead, the computing system can determine the graph paths shown in FIG. 12. Two of these graph paths make use of intersecting internal edges. In various embodiments, the computing system can select two main paths: a first main path directly from b to c and a second main path from b to c through a, g, f, e, and d. In response to an indication of a failure in either main path, the computing system can determine a recovery path using the selected internal edges. For example, the computing system can determine that the link corresponding to edge {b, c} failed. The computing system can determine that the graph path {{b, a}, {a, c}} is external edge disjoint with the path {{b, c}} and provide instructions to node $n_2$ to route communications associated with demand $d_3$ (corresponding to flow $f_3$) to node $n_1$; provide instructions to node $n_1$ to route such communications to node $n_8$; provide instructions to node $n_8$ to route such communications to node $n_7$; and provide instructions to node $n_7$ to route such communications to node $n_3$.

Figure 13A:
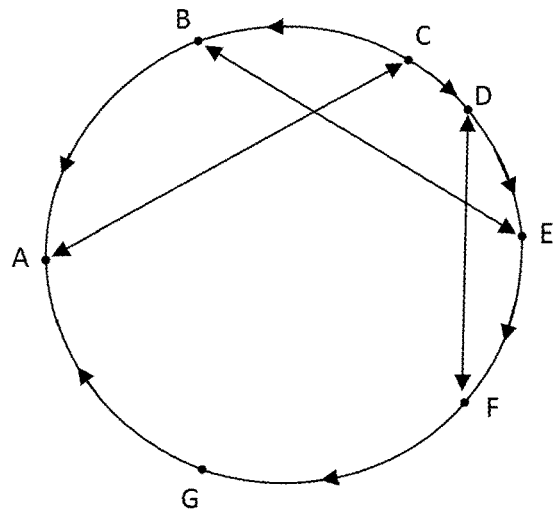
Figure 13B:
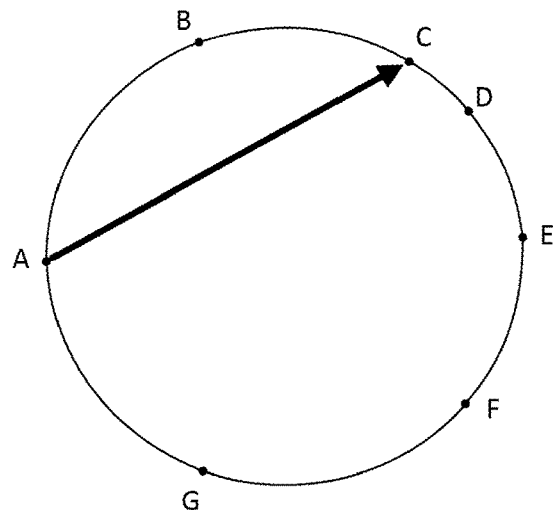
Figure 13C:
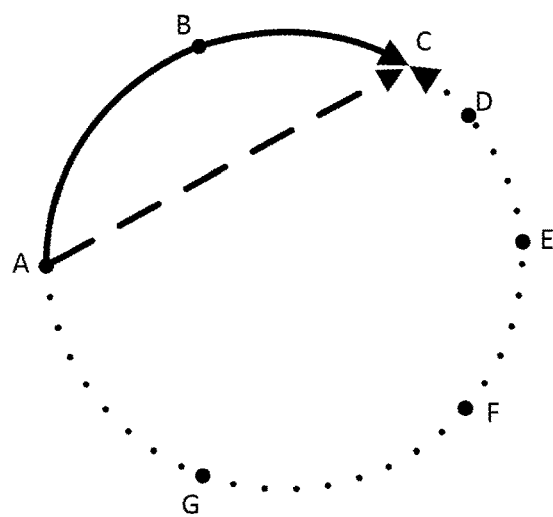

FIGS. 13A to 13C depicts identification of graph paths for a flow $f_4$=<a, c, $1_{++}$> on network graph 720 according to process 600. FIG. 13A depicts stream graph 1310, generated using the cycle of network graph 720 and the internal edges in the star sets depicted in FIGS. 9A and 9B. Stream graph 1310 includes bidirectional graph edges corresponding to internal edges in network graph 720 and graph arcs that are directed from target element c (corresponding to target vertex c of the network graph) to source element a (corresponding to source vertex a of the network graph). FIG. 13B depicts stream graph 1320, which depicts a path on the stream graph from the source element to the target element. The graph edges on the path in the stream graph correspond to internal edges in the network graph. These corresponding internal edges can be used to find graph paths for satisfying the flow. In accordance with process 600, because the flow has a 1++ protection type, intersecting internal edges on the network graph must be replaced with express internal edges. However, in this instance, there are no intersecting internal edges. While internal edge {a, c} would intersect with internal edges {b, c}, {a, b}, {a, e}, and {c, e}, the stream graph lacks graph edges corresponding to internal edges {b, c}, {a, b}, {a, e}, and {c, e}. Therefore there is no need to replace internal edge {a, c} with an express internal edge. FIG. 13C depicts network graph 1330, which includes the internal edges of network graph 720 usable to identify graph paths that satisfy the flow. Network graph 1330 shows three graph paths, one of which uses the sole selected internal edges. These graph paths are fully internal edge disjoint and satisfy the flow $f_4$ on network graph 720. The computing system can determine instructions for implementing corresponding network paths on network 710. For example, the computing system can provide instructions to node $n_1$ of network 710 to route communications associated with demand $d_4$ (corresponding to flow $f_4$) to node $n_8$; provide instructions to node $n_8$ to route such communications to node $n_7$; and provide instructions to node $n_7$ to route such communications to node $n_3$.

Configuring Exemplary Communication Network to Address 1+1+R and 1++ Demands

FIGS. 14A to 14H depict configuration of an exemplary communication network to provide type 2 protection, consistent with disclosed embodiments. In this example, network graph 1410 is a graph of a communication network having vertices a, b, c, d, e, f g, h, i, j, k, l, and m. In this example, network graph 1410 can have a flow corresponding to the demand d=<a, i,1++> on the communication network. As can be seen from FIG. 14A, vertices a and b of network graph 1410 can be disconnected from remainder of the network graph by failures in the links corresponding to edges {b, c} and {a, m}. Likewise, vertices f, g, h, i, and j of network graph 1410 can be disconnected from remainder of the network by failures in the links corresponding to edges {e, f} and {k, j}. The internal edges on graph 1410 can form six cliques:

$N_1=\{a,b\}$ $N_2=\{c,e\}$ $N_3=\{d,l\}$ $N_4=\{f,h\}$ $N_5=\{g,i,j\}$ $N_6=\{k,m\}$

As an initial step in the process of determining graph paths satisfying the flow on network graph 1410, the computing device can divide network 1410 into connected components. The computing device can create a connection graph 1420 having elements corresponding to internal edges. In the connection graph, elements corresponding to crossing internal edges are connected. For example, internal edge {a, b} does not cross with any other element and is therefore unconnected on the connection graph, while internal edge {d, l} crosses both internal edge {c, e} and internal edge {m, k} and is therefore connected to elements representing internal edge {c, e} and internal edge {m, k}.

The computing system can determine connected components using the connection graph. Connected component 1421 can include only the element corresponding to internal edge {a, b}. Connected component 1423 can include elements corresponding to internal edges {c, e}, {d, l}, and {k, m}. Connected component 1425 can include elements corresponding to internal edges {f, h}, {g, i}, {i, j}, and {g, j}.

In some embodiments, the computing device cannot ensure 1++, 1+R+R, or 1+1+R protection types when connection graph 1420 includes multiple connected components. Instead, the computing device can attempt to provide type 2 protection, as described herein. In some embodiments, the computing device can determine whether to provide type 2 protection as part of process 300, described herein. For example, as part of step 330 (or another step of process 300), the computing device can determine that a connection graph of the representation of the network includes multiple connected components. The computing device can then provide type two protection for the flows on that representation, as described with regards to FIGS. 14A to 14H.

As may be appreciated, type 2 protection can be specific to a particular flow on a representation of a network. For example, a network graph can include two flows. A first flow between two first endpoints can have cut two (e.g. only two edge-disjoint paths exist between the first endpoints of the first flow). A second flow between two second endpoints can have cut three (e.g., three edge-disjoint paths exist between the second endpoints of the second flow). The computing system can provide type 2 protection for the demand corresponding to the first flow, while maintaining the original protection type associated with the demand corresponding to the second flow.

Figure 14A:
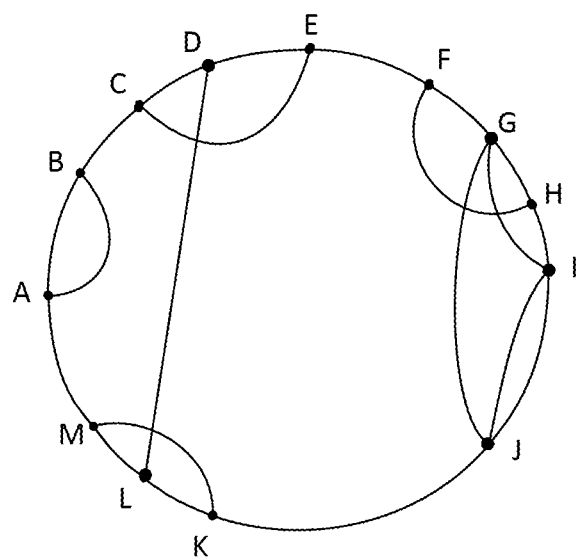
FIGS. 14A to 14J depict configuration of an exemplary communication network to provide type 2 protection for a demand on the network, consistent with disclosed embodiments.
Figure 14B:
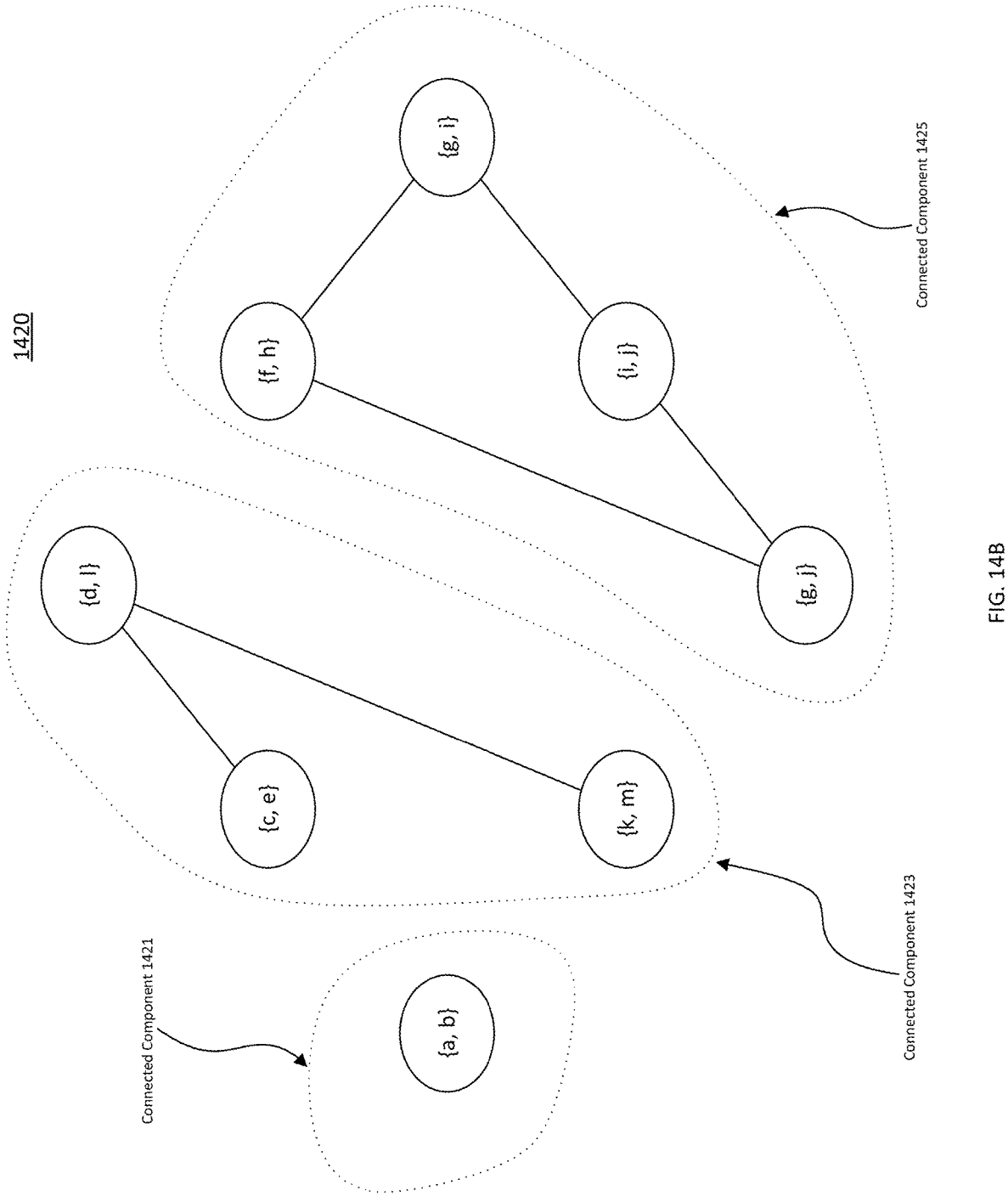
Figure 14C:
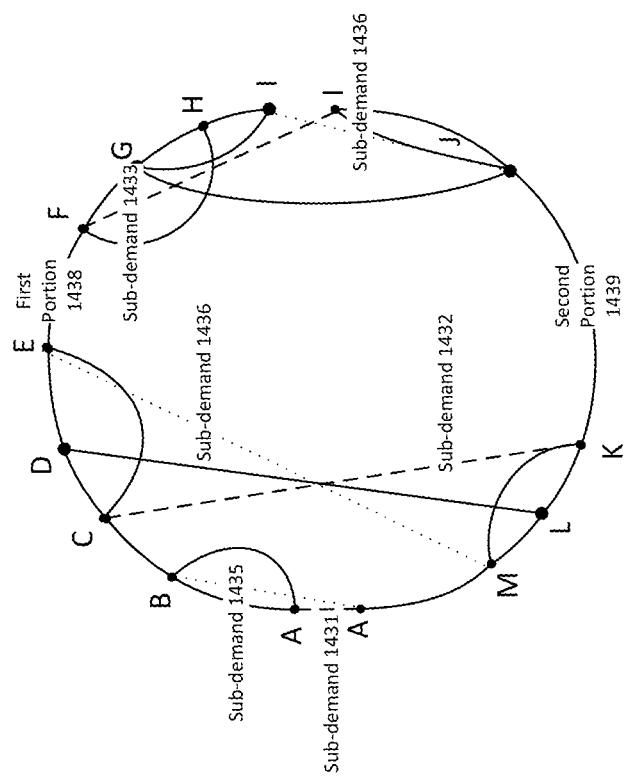

FIG. 14C depicts assignment of sub-flows for each connected component on network graph 1410, consistent with disclosed embodiments. In some embodiments, the computing system can decompose the cycle into a first portion 1438 and a second portion 1439. First portion 1438 can include the source vertex, the target vertex, and the vertices between the source and target vertex on one side of the cycle. Second portion 1439 can include the source vertex, the target vertex, and the vertices between the source and target vertex on the other side of the cycle. The endpoints will be duplicated and present on both portions of the decomposed cycle, as shown in FIG. 14C.

For a connected component, the computing system can create two sub-flows. The computing system can create a first sub-flow connecting the vertex of the connected component on the first portion closest to the source vertex with the vertex of the connected component on the second portion closest to the target vertex:

Sub-flow 1431={a,a}

Sub-flow 1432={c,k}

Sub-flow 1433={f,i}

The computing system can create a second sub-flow connecting the vertex of the connected component on the first portion closest to the target vertex with the vertex of the connected component on the second portion closest to the source vertex:

Sub-flow 1435={b,a}

Sub-flow 1436={e,m}

Sub-flow 1437={i,j}

A duplicate sub-flow or a sub-flow having the same source and target vertices (e.g., sub-demand 1431) can be disregarded. Thus each connected component can be associated with zero to two sub-flows.

Figure 14D:
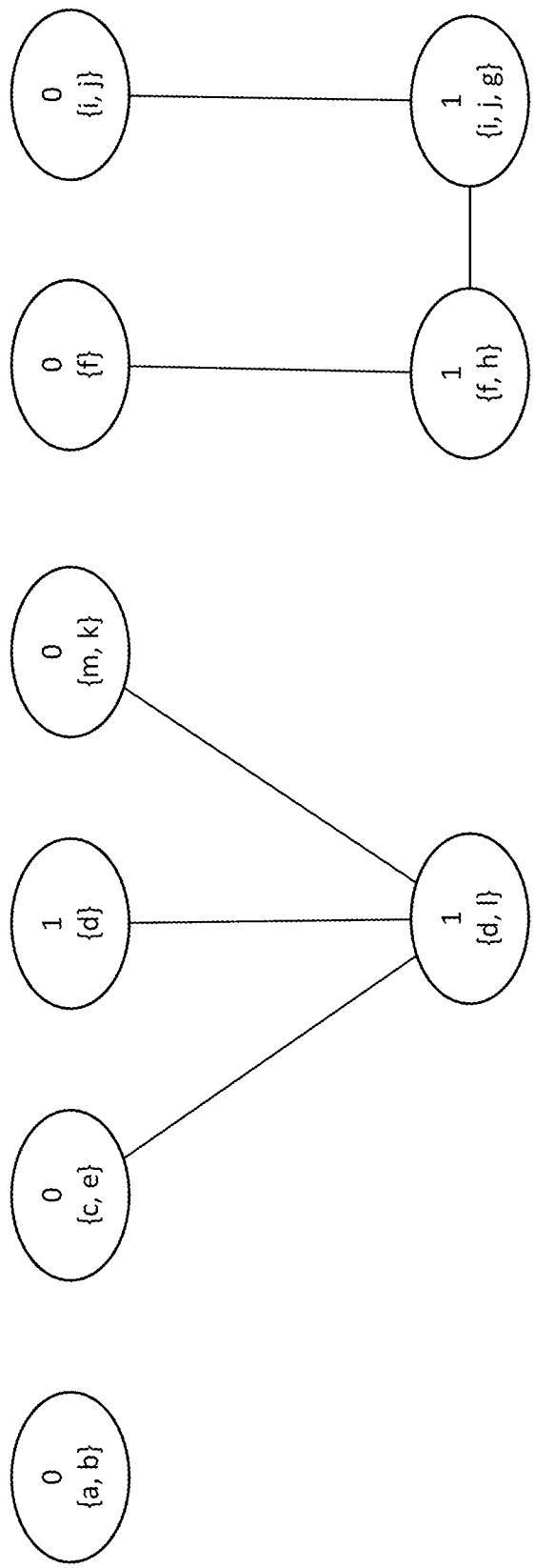

FIG. 14D depicts a clique graph 1440 constructed for network 1410, in accordance with process 500. Clique graph 1440 can be constructed using the previously identified sub-flows. The computing system can determine the union of the endpoints of the sub-flows:

$R=\{a,b,c,e,f,i,j,k,m\}$

The terminal nodes can be identified as the intersection, for each clique, of the endpoints for that clique and R:

$$T_{N_1}=\{a,b\}$$

$$T_{N_2}=\{c,e\}$$

$$T_{N_3}=\{\ \}$$

$$T_{N_4}=\{f\}$$

$$T_{N_5}=\{i,j\}$$

$$T_{N_6}=\{k,m\}$$

Note that $T_{N_3}$ is the null set. A terminal node for $N_3$ can therefore correspond to a selected (e.g., arbitrarily selected) endpoint of an edge in $N_3$. In this example, there are three extension nodes:

$$B_{31}=\{T_{N_3}\cup u_1|u_1\in V_{N_3}\backslash T_{N_3}\}=\{d,l\}$$

$$B_{41}=\{T_{N_4}\cup u_1|u_1\in V_{N_4}\backslash T_{N_4}\}=\{f,h\}$$

$$B_{51}=\{T_{N_5}\cup u_1|u_1\in V_{N_5}\backslash T_{N_5}\}=\{i,j,g\}$$

The terminal nodes can be connected to the nodes that extend them. Nodes corresponding to crossing sets can be connected. Minimal cost trees can be found for each connected component. The following clique-level endpoint sets can be identified:

$$C_1=\{a,b\}$$

$$C_2=\{c,e\}$$

$$C_3=\{d,l\}$$

$$C_4=\{f,h\}$$

$$C_5=\{i,j,g\}$$

$$C_6=\{k,m\}$$

In some embodiments, the computing device can determine a star set of internal edges corresponding to each clique-level endpoint set. In this example, however, the set of internal edges corresponding to each clique-level endpoint set is identical to the star set corresponding to each clique-level endpoint set.

Figure 14E:
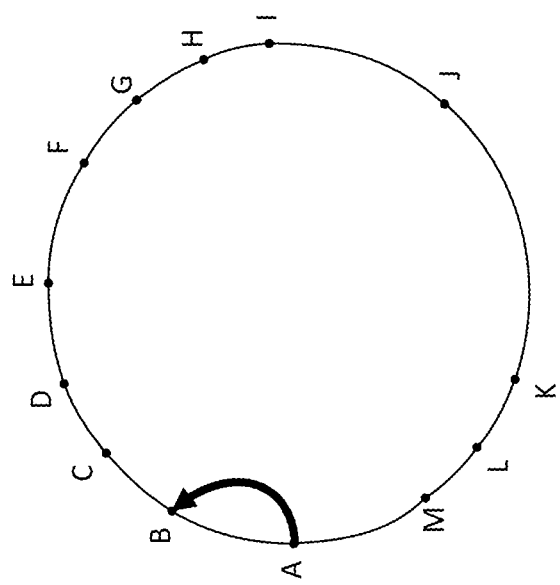
Figure 14G:
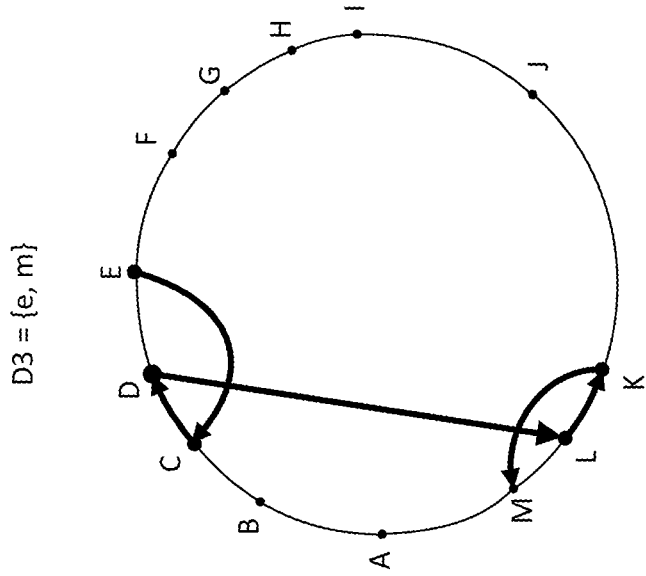
Figure 14F:
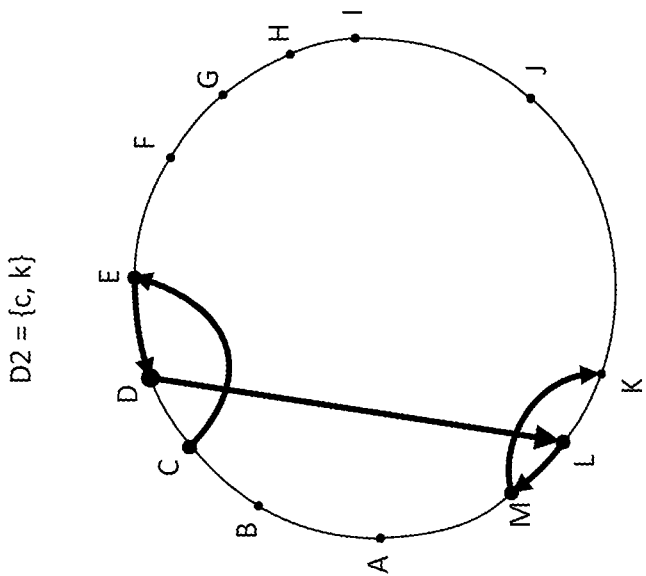
Figure 14H:
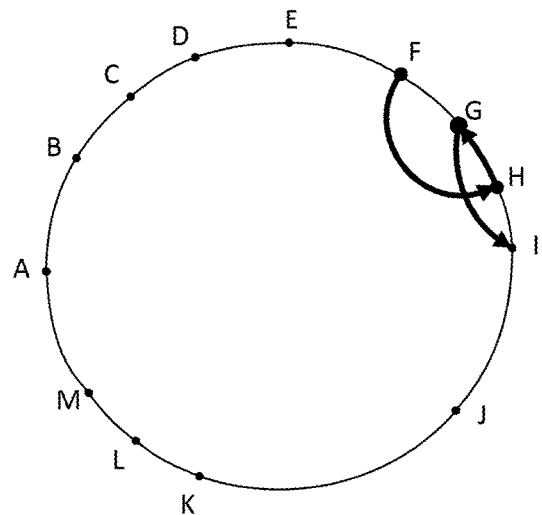
Figure 14I:
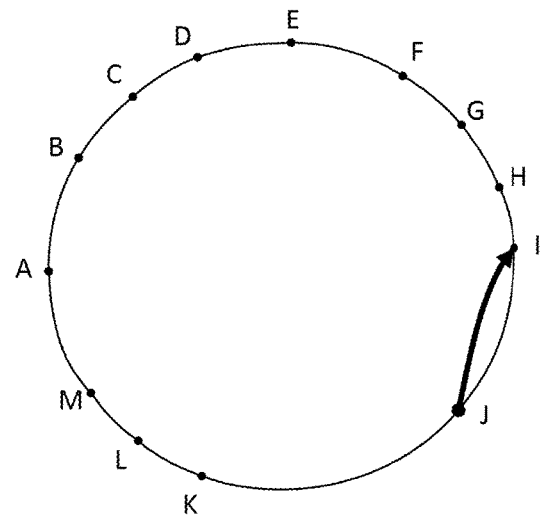

For each sub-flow, a stream graph can be generated and a path found from the source element to the target element of the stream graph, consistent with disclosed embodiments. FIGS. 14E to 14I depict the paths obtained for each sub-flow. FIG. 14E depicts a path in the stream graph corresponding to sub-flow 1435. FIG. 14F depicts a path in the stream graph corresponding to sub-flow 1432. FIG. 14G depicts a path in the stream graph corresponding to sub-flow 1436. FIG. 14H depicts a path in the stream graph corresponding to sub-flow 1433. FIG. 14I depicts a path in the stream graph corresponding to sub-flow 1437.

Figure 14J:
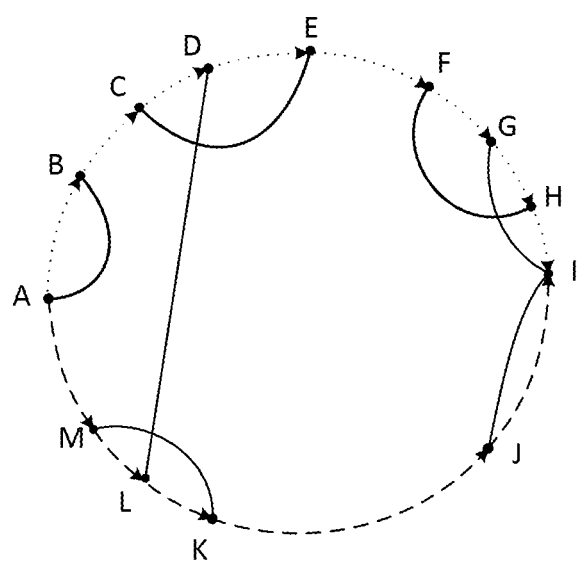

The computing system can determine the union of the internal edges used in satisfying the sub-flows. FIG. 14J depicts a network graph 1450 showing the union of the internal edges used in satisfying the sub-flows. FIG. 14J also depicts two graph paths that satisfy the overall flow on network graph 1410: a first graph path through the upper half of the cycle from a to i and a second path through the lower half of the cycle from a to i. In some embodiments, the identified internal edges can be associated with the flow. In response to any two failures that do not disconnect a from i, the computing device can use these internal edges to find a graph path from a from i. In various embodiments, the computing device can predetermine such a graph path (e.g., for each potential failure or combination of two failures). As described herein, the computing device can translate the graph paths identified on network graph 1450 into instructions to configure the corresponding communication network to provide type 2 protection on the network.

Figure 15A:
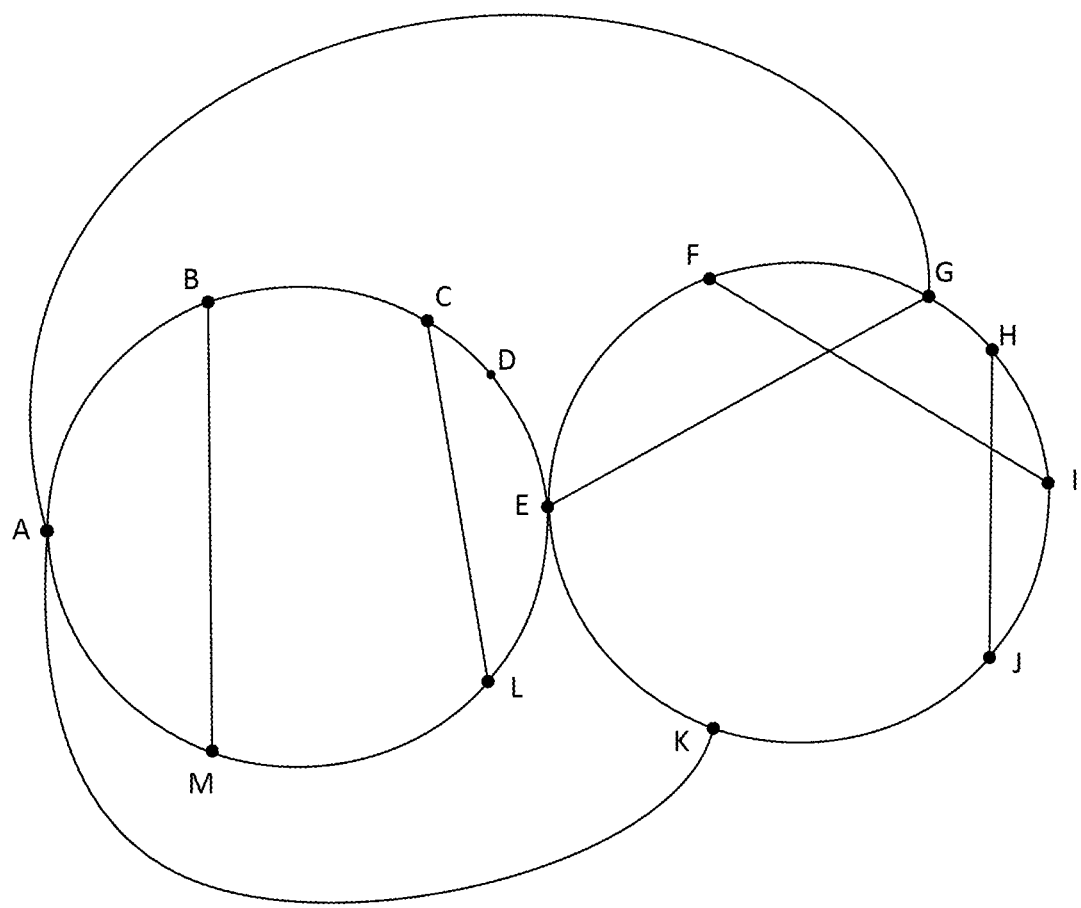
FIGS. 15A and 15B depict simplification of a non-simple cycle network graph into a simple cycle network graph suitable for use with the process of FIG. 3, consistent with disclosed embodiments.
Figure 15B:
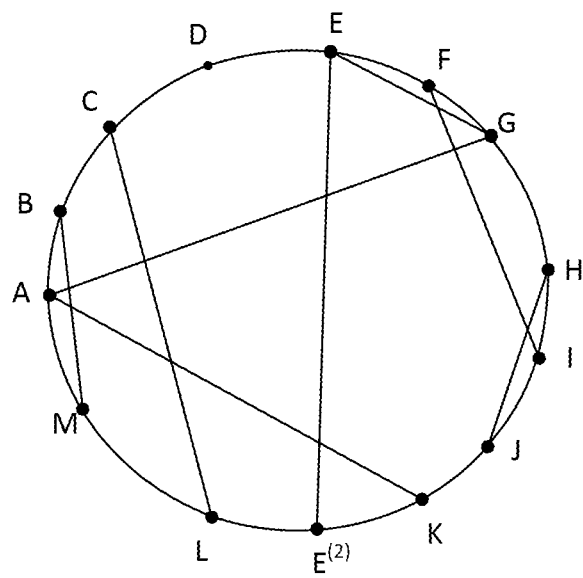

FIGS. 15A and 15B depict simplification of a non-simple cycle network graph into a simple cycle network graph suitable for use with process 300, in accordance with disclosed embodiments. FIG. 15A depicts a graph of a network. The graph can be described as an ordered list of vertices. In this case:

$$V=\{a,b,c,d,e,f,g,h,i,j,k,e,l,m\}$$

To simplify the cycle, when a vertex appears multiple times in V, each subsequent appearance can be replaced by a new vertex, the new vertex connected to the original vertex by an internal edge. In this example, the second appearance of e can be replaced with e(2):

$$V'=\{a,b,c,d,e,f,g,h,i,j,k,e^{(2)},l,m\}$$

The internal edge $\{e, e^{(2)}\}$ can be added to the graph. The resulting simple cycle is depicted in FIG. 15B.

Figure 16A:
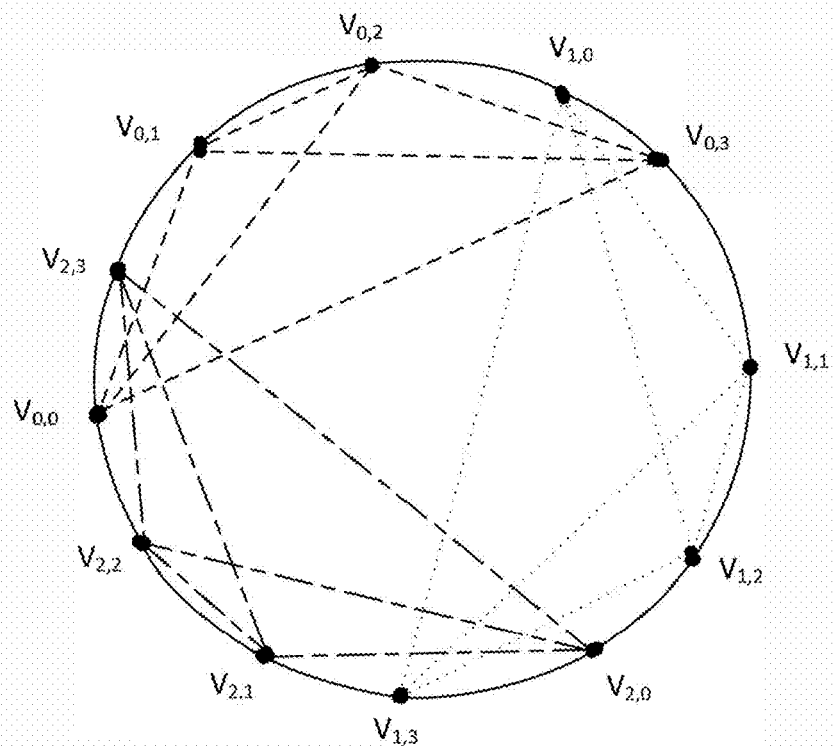
FIGS. 16A and 16B depict an exemplary application of the process of FIG. 3 to a particular network graph, consistent with disclosed embodiments.

FIG. 16A depicts an exemplary application of process 300 to a network graph 1610 with a particular structure and set of flows. When applied to such a network and such flows, process 300 can result in the selection of a set of graph paths having a particular structure. As described above with respect to process 300, a computing system can obtain a representation of a network and demands on that network. In such embodiments, the representation can include a network graph (e.g., network graph 1610, or a similarly structured network graph) and a set of flows corresponding to the demands on the network. The network graph can include vertices corresponding to nodes of the network and external edges corresponding to communication links in the network. The external edges can connect the vertices into a simple cycle. The network graph can include pairwise disjoint internal edges, each internal edge connecting two of the vertices, the pairwise disjoint internal edges collected into k cliques $N_0, N_2, \ldots, N_{k-1}$, where $N_i$ only crosses cliques $N_{i+1(\text{mod }k)}$ and $N_{i-1(\text{mod }k)}$. As depicted in FIG. 16A, vertices $V_{0,0}$ to $V_{0,3}$ can be the endpoints of a first clique, $V_{1,0}$ to $V_{1,3}$ can be the endpoints of a second clique, and $V_{2,0}$ to $V_{2,3}$ can be the endpoints of a third clique.

The flows can have protection type 1++ and can include, for every $i \in \{0, \ldots, k-1\}$ a first flow set and a second flow set. The first flow set for an $i \in \{0, \ldots, k-1\}$ can specify a first vertex endpoint in $N_i$ and at least one other vertex endpoint in $N_{i+1}$. The second flow set for an $i \in \{1, \ldots, k\}$ can specifying a last vertex endpoint in $N_i$ and at least one vertex endpoint in $N_{i-1}$. Accordingly, the flows for the graph depicted in FIG. 16A can be as follows:

$$f_{ia}=\langle V_{i,0}, V_{i+1(\text{mod }3),x}, 1_{++}\rangle \forall i\in\{0,1,2,\},\forall x\in\{0,1,2,3\}$$

$$f_{ib}=\langle V_{i,3}, V_{i-1(\text{mod }3),x}, 1_{++}\rangle \forall i\in\{0,1,2,\},\forall x\in\{0,1,2,3\}$$

For example, the first flow set for the first clique includes all the endpoint vertices in the second clique: $f_{1a}=\{\langle V_{0,0}, V_{1,0}, 1_{++}\rangle, \langle V_{0,0}, V_{1,1}, 1_{++}\rangle, \langle V_{0,0}, V_{1,2}, 1_{++}\rangle, \langle V_{0,0}, V_{1,3}, 1_{++}\rangle\}$. Similarly, the second flow set for the first clique includes all the endpoint vertices in the third clique: $f_{1b}=\{(V_{0,3}, V_{2,0}, 1_{++}), (V_{0,3}, V_{2,1}, 1_{++}), (V_{0,3}, V_{2,2}, 1++), (V_{0,3}, V_{2,3}, 1++)\}$.

Figure 16B:
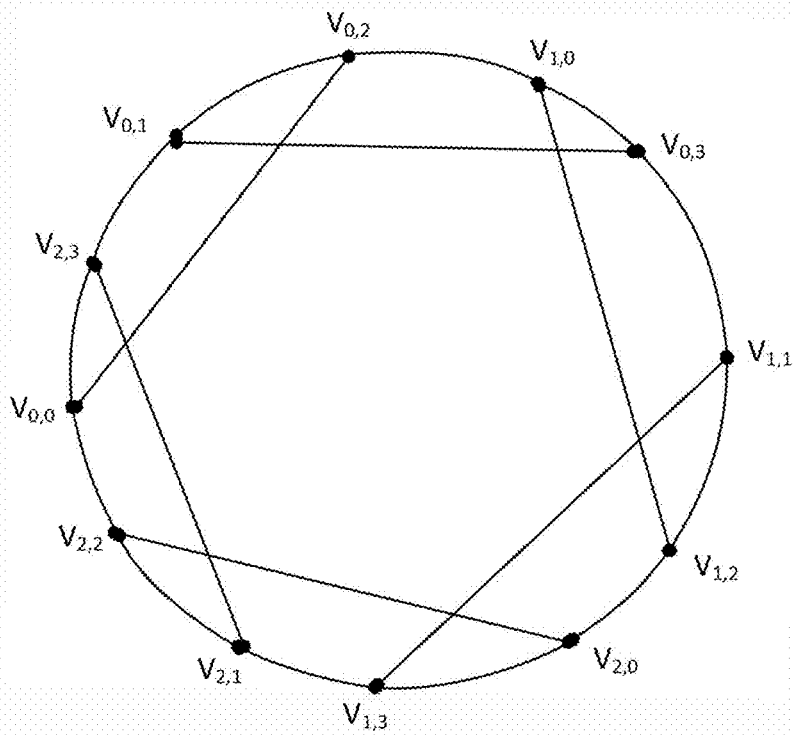

Consistent with disclosed embodiments, the computing system can determine, for each flow, three edge-disjoint graph paths that satisfy the flow, the three edge-disjoint graph paths collectively including exactly two internal edges. Consistent with disclosed embodiments, the computing system can use a clique graph to determine a first set of internal edges for the set of flow. Consistent with disclosed embodiments, the computing system can then use a stream graph and the first set of internal edges to determine the three edge-disjoint graph paths. FIG. 16B depicts a network graph 1630 including a second set of internal edges, the second set of internal edges being the union, for the flows on network graph 1610, of the two internal edges identified for each flow.

Consistent with disclosed embodiments, having determined graph paths satisfying the flows on network graph 1610, the computing system can provide instructions for configuring the network to satisfy the demands using network paths that correspond to the graph paths determined for the flows.

Figure 17A:
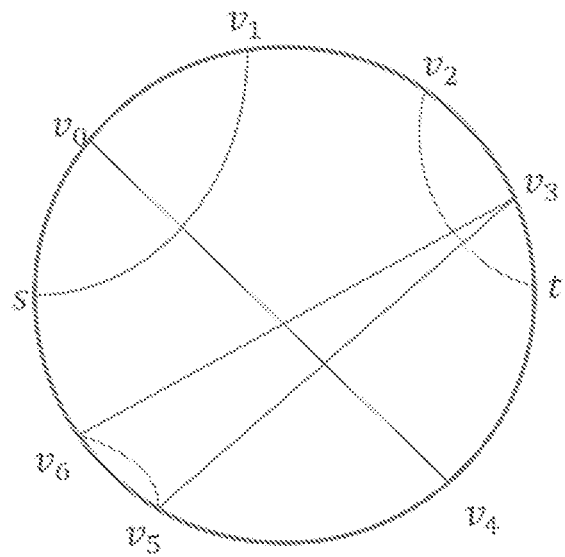
FIGS. 17A and 17B depict identification of a subset of internal edges using a Steiner graph, consistent with disclosed embodiments.
Figure 17B:
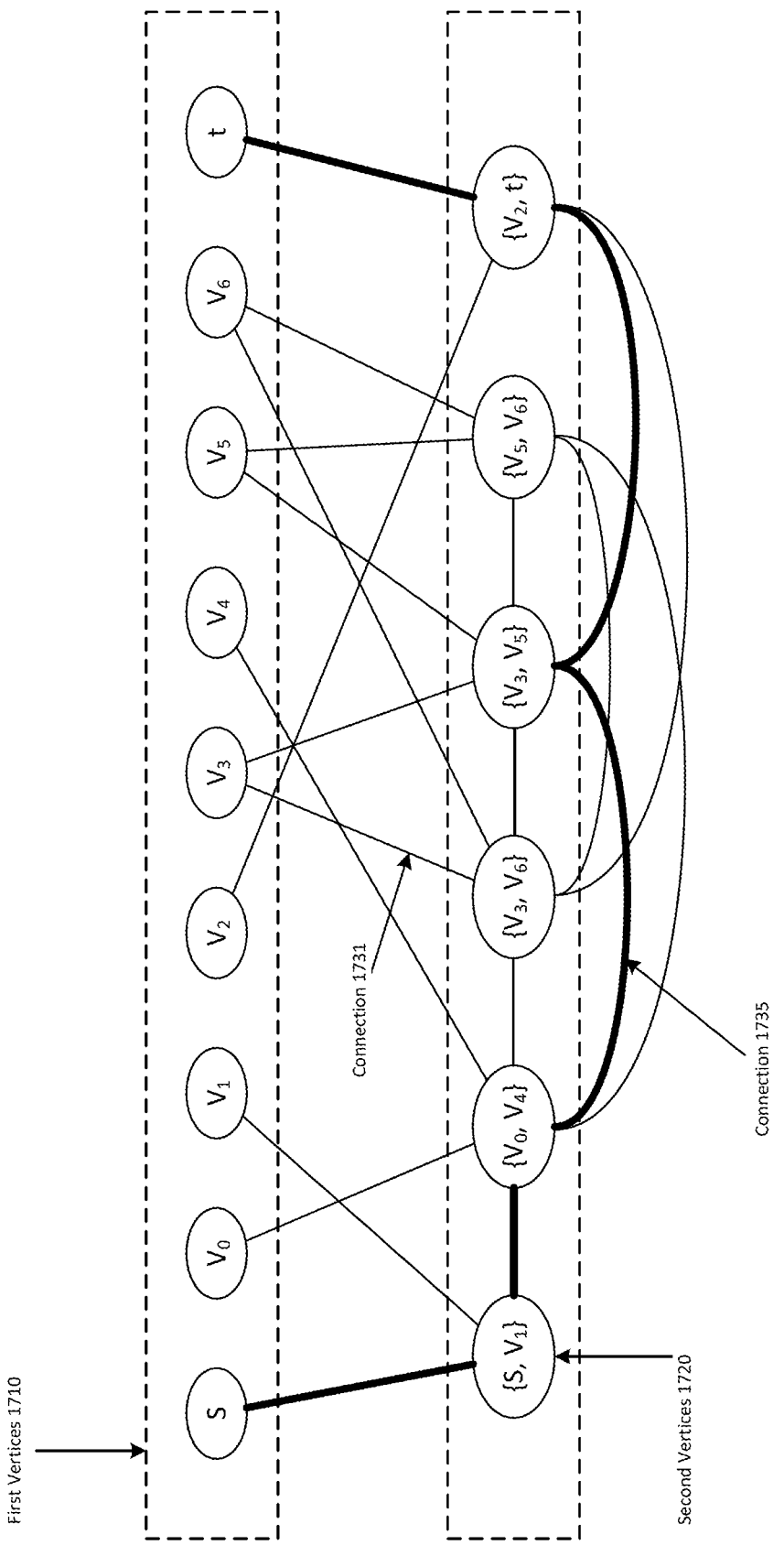

FIGS. 17A and 17B depict identification of a subset of internal edges using a Steiner graph, consistent with disclosed embodiments. In some embodiments, a Steiner graph can be used in place of a stream graph. For example, in step 350 of process 300, a Steiner graph can be used in place of a stream graph to identify a subset of internal edges. More specifically, in process 600, a Steiner graph can be constructed in place of a stream graph in step 610 and the Steiner graph can be used in place of the steam graph to identify a subset of internal edges in step 620. Accordingly, for at least this reason, process 300 and process 600 should be recognized as encompassing any suitable alternative (e.g., such as a Steiner graph, or another suitable alternative) to the use of a stream graph in identifying a subset of internal edges.

U.S. Pat. No. 10,958,562, entitled "Satisfying service demands in data communication networks" describes generation of a Steiner graph. This description of the generation of a Steiner graph is incorporated herein by reference. Furthermore, for consistency and clarity of terminology, an implementation using generation of a Steiner graph is described herein.

FIG. 17A depicts a representation 1700 of a network. Representation 1700 can be generated from the network according to the methods described herein. Representation 1700 can include a cycle C having vertices $V_C=\{s, t, v_0, v_1, v_2, v_3, v_4, v_5, v_6\}$. The vertices can be connected by internal and external edges, each edge defined by a pair of vertices in $V_C$ (e.g., $\{s, v_0\}$ and $\{v_0, v_4\}$ are external and internal edges on representation 1700).

FIG. 17B depicts a Steiner graph for the network of FIG. 17A. The Steiner graph can include two sets of vertices:

$$V_S = V_1 \cup V_2$$

where each vertex in $V_1$ corresponds to an element of $V_C$ (e.g., first vertices 1710) and each vertex in $V_2$ corresponds to an internal edge on representation 1700 (e.g., second vertices 1720). When an element in $V_1$ correspond to a vertex in $V_2$, and an element in $V_2$ corresponds to an internal edge having that vertex as an endpoint, a connection in the Steiner graph can connect the element in $V_1$ and the element in $V_2$. For example, the vertex $v_3$ corresponds to an element in $V_1$ and two elements in $V_2$ correspond to internal edges having $v_3$ as and endpoint. Connections 1731 and 1733 can connect the element in $V_1$ each of the elements in $V_2$. Elements in $V_2$ that correspond to intersecting elements can be connected in the Steiner graph (e.g., connection 1735 can connect elements in $V_2$ corresponds to intersecting internal edges $\{v_0, v_4\}$ and $\{v_3, v_5\}$).

A subset of internal edges on representation 1700 can be obtained by finding a path on the Steiner graph. The subset of internal edges can be determined for a flow having a source vertex and a target vertex (e.g., s and tin the example depicted in FIGS. 17A and 17B). The path can be a minimal cost path. For example, each edge or each node can have a zero or positive cost. The path cost can be the sum of the costs of the edges or nodes on that path. A path can be found using any suitable method that minimizes the path cost. This subset of internal edges can then be used to determine the graph paths for the flow. In FIG. 17B, the bolded connections indicate a minimal cost path, for an assignment of equal cost to all nodes, from s to t.

As described above with regards steps 630, 640, and 650 of FIG. 6, intersecting internal edges can be replaced with express internal edges, if the flow has a protection type requiring pairwise disjoint internal edges. As described above with regards to step 660 of FIG. 6, graph paths can be selected based on protection type using the identified internal edges (or express internal edges).

Figure 18:
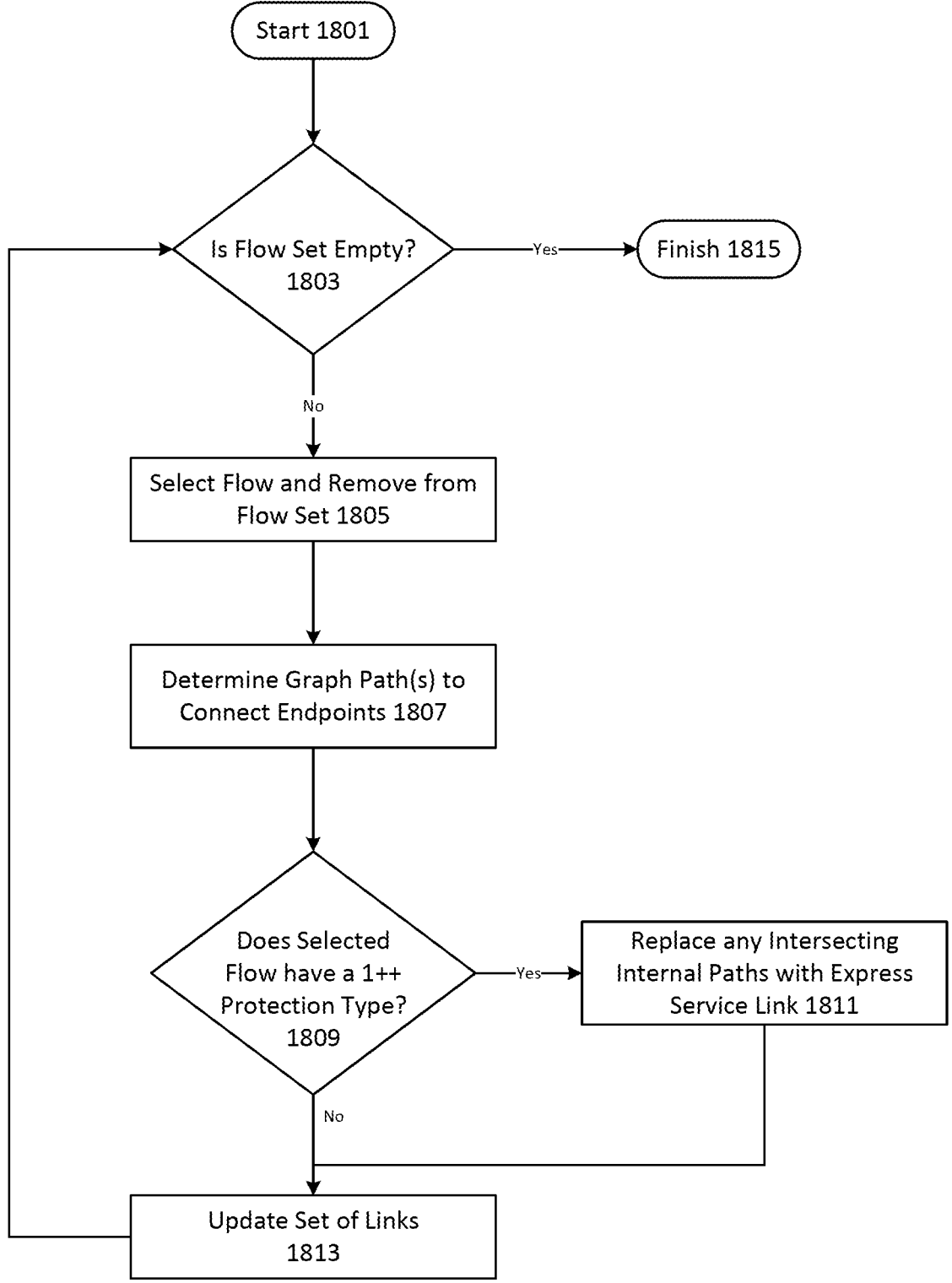
FIG. 18 depicts identification of a subset of internal edges through iterative addition of internal edges corresponding to selected flows, consistent with disclosed embodiments.

FIG. 18 depicts a process 1800 for identifying a subset of internal edges based on a set of flows, consistent with disclosed embodiments. Process 1800 can identify the subset of internal edges through iterative addition of internal edges corresponding to a selected flow. In some embodiments, process 1800 can be used in place of a clique graph. For example, in step 330 of process 300, process 1800 can be used in place of a clique to identify a subset of internal edges. More specifically, process 1800 can be used in place of processes 400 and 500 to identify a subset of internal edges. Accordingly, for at least this reason, process 300 should be recognized as encompassing any suitable alternative (e.g., such as process 1800, or another suitable alternative) to the use of a clique graph in identifying a subset of internal edges.

In step 1801, process 1800 can start. Process 1800 can be performed by a computing device (e.g., network management system 150, or another suitable computing device). Process 1800 can be performed as part of process 300 (e.g., in place of step 330 of process 300). The computing device can obtain a representation of a network and a non-empty set of flows for that representation, as described herein. The computing device can initialize a subset of the internal edges to an empty set.

In step 1803, the computing device can determine whether the flow set is empty. If the flow set is empty, then process 1800 can proceed to step 1815 and terminate. Other processes (e.g., process 300, or the like) can then use the subset of internal edges generated by process 1800. If the flow set is non-empty, then process 1800 can process to step 1805.

In step 1805, the computing device can select a flow in the flow set. The selected flow can be removed from the flow set. The disclosed embodiments are not limited to a method or criterion for selecting the flow. In some embodiments, the flow can be selected randomly. In various embodiments, the flow can be selected based on characteristic(s) of the flow and of the other flows in the flow set. For example, the flow can be selected based on a position of the source vertex and target vertex of the flow in the representation, a distance (e.g., as measured in vertices, edges, or the like) between the source vertex and target vertex of the flow, a protection type of the flow, or another suitable characteristic of the flow.

In step 1807, the computing device can determine one or more graph paths connecting the endpoints of the flow on the representation. In some embodiments, the computing device can select a graph path based the subset of internal edges.

For example, the computing device can select a graph path that connects the endpoints of the flow while adding a minimal number of internal edges to the subset of internal edges. Thus the computing device, in generating the graph path, can favor paths that reuse internal edges already in the subset of internal edges. The disclosed embodiments are not limited to any particular method of finding such graph paths. In some embodiments, weights can be assigned to internal edges and the computing device can seek to minimize a total weight for the graph path. Weights for internal edges included in the subset of internal edges can be lower than weights for edges not included in the subset of internal edges, causing the computing device to favor internal edges already in the subset when determining a graph path. When the computing device determines multiple graph paths for a flow, the graph paths can be external edge disjoint or both internal and external edge disjoint, based on the protection type of the flow (e.g., 1+1+R can be external edge disjoint, while 1++ can be internal and external edge disjoint).

In step 1809, the computing device can determine whether the selected flow has 1++ protection type. If so, then process 1800 can proceed to step 1811. Otherwise, process 1800 can proceed to step 1813.

In step 1811, the computing device can replace intersecting internal paths determined in step 1807 for the flow with express internal paths. Intersecting internal edges can be replaced with express internal edges as described above with regards steps 630, 640, and 650 of FIG. 6.

In step 1813, the computing device can update the subset of internal edges. The subset of internal edges can be updated to be the union of the existing subset of internal edges and any internal edges in the graph path(s) determined in step 1807 (as modified by the replacement of intersecting internal edges with express internal edges in step 1811). Thus the set of internal edges can grow incrementally as flows are selected and removed from the set of flows. This naively generated set of internal edges can then serve as a starting point for additional refinement in step 350.

In part for convenience of explanation, the disclosed embodiments have been described with regards to a network topology, a network graph, and a stream graph. In some embodiments, the computing system can maintain these data structures separately. For example, the computing system can obtain the network topology, generate a network graph separate from the network topology, and generate a stream graph separate from the network graph. In various embodiments, the computing system can manipulate a single data structure that serves, at various times, as the network topology, network graph, and the stream graph. For example, the computing network can obtain the network topology, modify the network topology to form the network graph, and modify the network graph to form the stream graph. Combinations of these approaches are also possible. For example, the computing system can maintain the network topology separate from a data structure that performs the functions of the network graph and the stream graph. Accordingly, reference in the specification or claims to the network topology, network graph, and stream graph, or components thereof (e.g., nodes, vertices, edges, links, arcs, demands, flows, or the like), can encompass both the use of separate data structures and the use of in-place modifications to the same data structure.

In exemplary embodiments, a non-transitory computer-readable storage medium including instructions is also provided, and the instructions may be executed by a device (such as a computer), for performing the above-described methods. For example, the non-transitory computer-readable storage medium may be a read-only memory (ROM), a Random-Access Memory (RAM), an electrically erasable programmable read-only memory (EEPROM), Programmable Array Logic (PAL), a disk, an optical disc, a Digital Versatile Disc (DVD), and so on.

In the preceding disclosure, various example embodiments have been described with reference to the accompanying drawings. It will, however, be evident that various modifications and changes may be made thereto, and additional embodiments may be implemented, without departing from the broader scope of the disclosure as set forth in the claims that follow. The disclosure and drawings are accordingly to be regarded in an illustrative rather than restrictive sense.

Therefore, it is intended that the disclosed embodiments and examples be considered as examples only, with a true scope of the present disclosure being indicated by the following claims and their equivalents.

What is claimed is:

1. A non-transitory, computer-readable medium containing first instructions that, when executed by at least one processor of a system, cause the system to perform operations comprising:
    selecting a cycle of a communication network, the communication network including network nodes configured to communicate using communication links, the cycle including a subset of the network nodes and communication links in the communication network, and identifying demands for the communication network that originate and terminate on network nodes in the subset;
    generating a representation of the communication network and the demands, the representation including:
        vertices corresponding to network nodes of the communication network on the cycle,
        external edges corresponding to communication links of the communication network on the cycle, the external edges connecting the vertices,
        internal edges, each internal edge connecting two of the vertices, and
        a set of flows corresponding to the identified demands, each flow having a source vertex and a target vertex;
    identifying a subset of the internal edges based on the set of flows;
    determining, using a stream graph generated based on a one of the set of flows and the identified subset of the internal edges, a set of graph paths that satisfy the one of the flows, comprising:
        obtaining an indication of a set of functional external edges and a set of functional internal edges; and
        determining a graph path from a source vertex of the one of the flows to a target vertex of the one of the flows, the determination restricted to:
            the set of functional external edges; and
            an intersection of the set of functional internal edges and the identified subset of the first internal edges; and
    providing second instructions for configuring the communication network to satisfy a one of the demands that corresponds to the one of the set of flows, the second instructions indicating a set of network paths that corresponds to the set of graph paths.

2. The non-transitory, computer-readable medium of claim 1, wherein:
    identifying the subset of the internal edges based on the set of flows comprises:
        selecting a flow from the set of flows;
        determining at least one graph path from a source vertex to a target vertex of the flow; and
        updating the subset of the internal edges based on the determined at least one graph path.

3. The non-transitory, computer-readable medium of claim 1, wherein:
identifying the subset of the internal edges based on the set of flows comprises:
identifying disjoint cliques of the internal edges;
building a graph using the identified disjoint cliques and the set of flows;
identifying sub-cliques in a tree of the graph; and
converting the identified sub-cliques into the identified subset of the internal edges.

4. The non-transitory, computer-readable medium of claim 3, wherein:
converting the identified sub-cliques into the identified subset of the internal edges comprises:
converting the identified sub-cliques into star sets of internal edges; and
generating the identified subset of the internal edges, the identified subset of the internal edges being the union of the star sets.

5. The non-transitory, computer-readable medium of claim 3, wherein:
building the graph using the identified disjoint cliques and the set of flows comprises:
creating terminal vertex sets based on the set of flows;
creating extended vertex sets; and
connecting vertex sets satisfying connection criteria to form the graph.

6. The non-transitory, computer-readable medium of claim 1, wherein:
determining the set of graph paths that satisfy the one of the set of flows comprises:
generating the stream graph, the stream graph including:
graph elements corresponding to the vertices, the graph elements including a starting graph element corresponding to the source vertex and a finishing graph element corresponding to the target vertex,
graph arcs corresponding to the external edges, each graph arc directed away from the finishing graph element and towards the starting graph element, and
graph edges corresponding to the internal edges; and
identifying a first directed path from the starting graph element to the finishing graph element.

7. The non-transitory, computer-readable medium of claim 6, wherein:
determining the set of graph paths that satisfy the one of the flows further comprises:
generating an updated first directed path by replacing a set of intersecting graph edges in the first directed path with an express graph edge corresponding to an internal edge; and
determining three graph paths from the source vertex to the target vertex, the determination restricted to:
the external edges; and
internal edges corresponding to the graph edges in the updated first directed path.

8. The non-transitory, computer-readable medium of claim 7, wherein:
the three graph paths are pairwise edge-disjoint.

9. The non-transitory, computer-readable medium of claim 7, wherein:
identifying the subset of the internal edges based on the set of flows comprises:
identifying connected components in the representation;
associating sub-flows with each of the connected components based on a one of the set of flows; and
generating a clique graph using the sub-demands.

10. A non-transitory, computer-readable medium containing first instructions that, when executed by at least one processor of a system, cause the system to perform operations comprising:
obtaining a first representation of a cycle of a communication network, the communication network including network nodes configured to communicate using communication links, the cycle including a subset of the network nodes and communication links in the communication network, and a first demand on the communication network that originates and terminates on network nodes in the subset, the first representation including:
vertices corresponding to network nodes of the communication network on the cycle,
external edges corresponding to communication links of the communication network on the cycle, the external edges connecting the vertices,
first internal edges, each first internal edge connecting two of the vertices, and
a first flow corresponding to the first demand on the communication network;
identifying a subset of the first internal edges using a graph corresponding to the first flow, the graph including graph arcs corresponding to the external edges and graph edges corresponding to the first internal edges;
determining a set of graph paths that satisfy the first flow using the identified subset of the first internal edges, comprising:
obtaining an indication of a set of functional external edges and a set of functional internal edges; and
determining a graph path from a source vertex of the first flow to a target vertex of the first flow, the determination restricted to:
the set of functional external edges; and
an intersection of the set of functional internal edges and the identified subset of the first internal edges; and
providing second instructions for configuring the communication network to satisfy the first demand, the second instructions indicating a set of network paths that corresponds to the set of graph paths.

11. The non-transitory, computer-readable medium of claim 10, wherein:
determining the set of graph paths that satisfy the first flow using the identified subset of the first internal edges comprises:
generating a Steiner graph including Steiner graph elements corresponding to the vertices and Steiner graph elements corresponding to the internal edges; and
identifying a first Steiner graph path from the Steiner graph element corresponding to the source vertex of the flow to the Steiner graph element corresponding to the target vertex of the flow.

12. The non-transitory, computer-readable medium of claim 10, wherein:
the first flow further specifies a protection type; and
the set of graph paths is determined based on the protection type and using the identified subset of the first internal edges.

13. The non-transitory, computer-readable medium of claim 10, wherein:
identifying the subset of the first internal edges using the graph comprises:
generating the graph, the graph including:
graph elements corresponding to the vertices, the graph elements including a starting graph element corresponding to a source vertex of the first flow and a finishing graph element corresponding to a target vertex of the first flow, and
wherein each graph arc is directed away from the finishing graph element and towards the starting graph element; and
determining a first directed path from the starting graph element to the finishing graph element, the identified subset of the first internal edges being the first internal edges corresponding to the graph edges included in the first directed path.

14. The non-transitory, computer-readable medium of claim 10, wherein:
determining the set of graph paths comprises:
replacing ones of the identified subset of the first internal edges with an express internal edge; and
determining three pairwise internal edge-disjoint paths from a source vertex of the first flow to a target vertex of the first flow, the determination restricted to:
the external edges; and
the identified subset of the first internal edges.

15. The non-transitory, computer-readable medium of claim 10, wherein:
obtaining the first representation of the communication network comprises:
selecting the cycle of the communication network and identifying demands that originate and terminate on the cycle, the identified demands including the first demand;
generating a second representation based on the cycle, the second representation including the vertices, the external edges, and second internal edges;
selecting the first internal edges from among the second internal edges, selecting comprising:
constructing a clique graph using the demands;
determining a tree of the clique graph; and
selecting the first internal edges based on the tree.

16. A non-transitory, computer-readable medium containing first instructions that, when executed by at least one processor of a system, cause the system to perform operations comprising:
obtaining a first representation of a cycle of a communication network, the communication network including network nodes configured to communicate using communication links, the cycle including a subset of the network nodes and communication links in the communication network, and demands on the communication network that originate and terminate on network nodes in the subset, the first representation including:
vertices corresponding to network nodes of the network on the cycle,
external edges corresponding to communication links of the communication network on the cycle, the external edges connecting the vertices,
first internal edges, each first internal edge connecting two of the vertices, and
flows corresponding to the demands;
identifying a subset of the first internal edges based on the flows, identification comprising:
building a clique graph using the flows;
identifying sub-cliques on a tree of the clique graph; and
converting the identified sub-cliques into the identified subset of the first internal edges;
determining a set of graph paths that satisfy a one of the flows using the identified subset of the first internal edges, comprising:
obtaining an indication of a set of functional external edges and a set of functional internal edges; and
determining a graph path from a source vertex of the one of the flows to a target vertex of the one of the flows, the determination restricted to:
the set of functional external edges; and
an intersection of the set of functional internal edges and the identified subset of the first internal edges; and
providing second instructions for configuring the communication network to satisfy a one of the demands that corresponds to the one of the flows, the second instructions indicating a set of network paths that corresponds to the set of graph paths.

17. The non-transitory, computer-readable medium of claim 16, wherein:
converting the identified sub-cliques into the identified subset of the first internal edges comprises:
converting the identified sub-cliques into star sets of the first internal edges; and
generating the identified subset of the first internal edges, the identified subset of the first internal edges being the union of the star sets.

18. The non-transitory, computer-readable medium of claim 16, wherein:
building the clique graph using the flows comprises:
creating terminal vertex sets based on the flows;
creating extended vertex sets, each extended vertex set connected to a corresponding terminal vertex set; and
connecting intersecting extended vertex sets.

* * * * *